US009547439B2

(12) United States Patent
Bi et al.

(10) Patent No.: US 9,547,439 B2
(45) Date of Patent: Jan. 17, 2017

(54) DYNAMICALLY-POSITIONED CHARACTER STRING SUGGESTIONS FOR GESTURE TYPING

(71) Applicant: Google Inc., Mountain View, CA (US)

(72) Inventors: Xiaojun Bi, Sunnyvale, CA (US); Shumin Zhai, Los Altos, CA (US); Michael Andrew Cleron, Menlo Park, CA (US)

(73) Assignee: Google Inc., Mountain View, CA (US)

( * ) Notice: Subject to any disclaimer, the term of this patent is extended or adjusted under 35 U.S.C. 154(b) by 255 days.

(21) Appl. No.: 14/537,730

(22) Filed: Nov. 10, 2014

(65) Prior Publication Data

US 2015/0074586 A1 Mar. 12, 2015

Related U.S. Application Data

(63) Continuation of application No. 13/923,132, filed on Jun. 20, 2013, now Pat. No. 8,887,103.

(Continued)

(51) Int. Cl.
G06F 3/048 (2013.01)
G06F 3/0488 (2013.01)
(Continued)

(52) U.S. Cl.
CPC ......... *G06F 3/04886* (2013.01); *G06F 3/0237* (2013.01); *G06F 3/0481* (2013.01);
(Continued)

(58) Field of Classification Search
CPC .................................................. G06F 3/0482
(Continued)

(56) References Cited

U.S. PATENT DOCUMENTS 5,896,321 A 4/1999 Miller et al.
6,032,053 A 2/2000 Schroeder et al.
(Continued)

FOREIGN PATENT DOCUMENTS

EP 0844570 A2 5/1998
EP 1887451 A2 10/2001
(Continued)

OTHER PUBLICATIONS

International Preliminary Report on Patentability from International Application No. PCT/US2014/033665, mailed Nov. 5, 2015, 10 pp.
(Continued)

*Primary Examiner* — William Titcomb
(74) *Attorney, Agent, or Firm* — Shumaker & Sieffert, P.A.

(57) ABSTRACT

A computing device outputs, for display, a virtual keyboard comprising a plurality of virtual keys. Furthermore, the computing device receives an indication of a first movement of an input object along a spatial path. The computing device determines, based on locations of the virtual keys and locations along the spatial path, a plurality of character strings. In response to determining that the first movement has ceased for at least a threshold amount of time, the computing device outputs, for display, the plurality of character strings. While the character strings are displayed, the computing device receives an indication of a second movement of the input object. The computing device selects, in response to the indication of the second movement, and based at least in part on a direction of the second movement of the input object, a particular character string from the plurality of character strings.

20 Claims, 9 Drawing Sheets

Related U.S. Application Data

(60) Provisional application No. 61/814,690, filed on Apr. 22, 2013.

(51) Int. Cl.
  *G06F 3/0481* (2013.01)
  *G06F 3/0482* (2013.01)
  *G06F 17/27* (2006.01)
  *G06F 3/023* (2006.01)

(52) U.S. Cl.
  CPC ........ *G06F 3/0482* (2013.01); *G06F 3/04883* (2013.01); *G06F 17/276* (2013.01)

(58) Field of Classification Search
  USPC ........................................................ 715/773
  See application file for complete search history.

(56) References Cited

U.S. PATENT DOCUMENTS

| | | | |
|---|---|---|---|
| 6,286,064 B1 | 9/2001 | King et al. |
| 6,292,179 B1 | 9/2001 | Lee |
| 6,801,190 B1 | 10/2004 | Robinson et al. |
| 7,028,259 B1 | 4/2006 | Jacobson |
| 7,030,863 B2 | 4/2006 | Longe et al. |
| 7,042,443 B2 | 5/2006 | Woodard et al. |
| 7,075,520 B2 | 7/2006 | Williams |
| 7,088,345 B2 | 8/2006 | Robinson et al. |
| 7,098,896 B2 | 8/2006 | Kushler et al. |
| 7,145,554 B2 | 12/2006 | Bachmann |
| 7,151,530 B2 | 12/2006 | Roeber et al. |
| 7,199,786 B2 | 4/2007 | Suraqui |
| 7,250,938 B2 | 7/2007 | Kirkland et al. |
| 7,251,367 B2 | 7/2007 | Zhai |
| 7,277,088 B2 | 10/2007 | Robinson et al. |
| 7,336,827 B2 | 2/2008 | Geiger et al. |
| 7,382,358 B2 | 6/2008 | Kushler et al. |
| 7,453,439 B1 | 11/2008 | Kushler et al. |
| 7,454,717 B2 * | 11/2008 | Hinckley ............ G06F 3/04842 715/863 |
| 7,487,461 B2 | 2/2009 | Zhai et al. |
| 7,508,324 B2 | 3/2009 | Suraqui |
| 7,542,029 B2 | 6/2009 | Kushler |
| 7,584,093 B2 | 9/2009 | Potter et al. |
| 7,706,616 B2 | 4/2010 | Kristensson et al. |
| 7,716,579 B2 | 5/2010 | Gunn et al. |
| 7,730,402 B2 | 6/2010 | Song |
| 7,750,891 B2 | 7/2010 | Stephanick et al. |
| 7,895,518 B2 | 2/2011 | Kristensson |
| 7,920,132 B2 | 4/2011 | Longe et al. |
| 7,921,361 B2 | 4/2011 | Gunn et al. |
| 8,036,878 B2 | 10/2011 | Assadollahi |
| 8,059,101 B2 | 11/2011 | Westerman et al. |
| 8,135,582 B2 | 3/2012 | Suraqui |
| 8,232,973 B2 | 7/2012 | Kocienda et al. |
| 8,266,528 B1 | 9/2012 | Hayes |
| 8,299,943 B2 | 10/2012 | Longe |
| 8,438,160 B2 | 5/2013 | Aravamudan et al. |
| 8,514,178 B2 | 8/2013 | Song et al. |
| 8,542,206 B2 | 9/2013 | Westerman et al. |
| 8,552,984 B2 | 10/2013 | Knaven |
| 8,587,542 B2 | 11/2013 | Moore |
| 8,619,048 B2 | 12/2013 | Shimoni |
| 8,667,414 B2 | 3/2014 | Zhai et al. |
| 8,701,032 B1 | 4/2014 | Zhai et al. |
| 8,782,549 B2 | 7/2014 | Ouyang et al. |
| 8,819,574 B2 | 8/2014 | Ouyang et al. |
| 8,843,845 B2 | 9/2014 | Ouyang et al. |
| 8,850,350 B2 | 9/2014 | Bi et al. |
| 8,887,103 B1 * | 11/2014 | Bi ................ G06F 3/0482 715/773 |
| 9,021,380 B2 * | 4/2015 | Zhai .................. G06F 3/0237 715/773 |
| 9,158,974 B1 * | 10/2015 | Laska ................ H04N 5/2628 |
| 2002/0013794 A1 | 1/2002 | Carro et al. |
| 2002/0015064 A1 | 2/2002 | Robotham et al. |
| 2002/0129012 A1 | 9/2002 | Green et al. |
| 2002/0143543 A1 | 10/2002 | Sirivara |
| 2002/0194223 A1 | 12/2002 | Meyers et al. |
| 2003/0095053 A1 | 5/2003 | Kandogan et al. |
| 2003/0095104 A1 | 5/2003 | Kandogan et al. |
| 2003/0097252 A1 | 5/2003 | Mackie |
| 2003/0165801 A1 | 9/2003 | Levy |
| 2004/0120583 A1 | 6/2004 | Zhai |
| 2004/0140956 A1 | 7/2004 | Kushler et al. |
| 2005/0052406 A1 | 3/2005 | Stephanick et al. |
| 2005/0114115 A1 | 5/2005 | Kardis et al. |
| 2005/0190973 A1 | 9/2005 | Kristensson et al. |
| 2006/0004638 A1 | 1/2006 | Royal et al. |
| 2006/0026536 A1 | 2/2006 | Hotelling et al. |
| 2006/0028450 A1 | 2/2006 | Suraqui |
| 2006/0055669 A1 | 3/2006 | Das |
| 2006/0119582 A1 | 6/2006 | Ng et al. |
| 2006/0176283 A1 | 8/2006 | Suraqui |
| 2006/0253793 A1 | 11/2006 | Zhai et al. |
| 2006/0265648 A1 | 11/2006 | Rainisto et al. |
| 2007/0016862 A1 | 1/2007 | Kuzmin |
| 2007/0040813 A1 | 2/2007 | Kushler et al. |
| 2007/0061753 A1 | 3/2007 | Ng et al. |
| 2007/0083276 A1 | 4/2007 | Song |
| 2007/0094024 A1 | 4/2007 | Kristensson et al. |
| 2007/0213983 A1 | 9/2007 | Ramsey |
| 2008/0017722 A1 | 1/2008 | Snyder et al. |
| 2008/0100579 A1 | 5/2008 | Robinson et al. |
| 2008/0122796 A1 | 5/2008 | Jobs et al. |
| 2008/0172293 A1 | 7/2008 | Raskin et al. |
| 2008/0232885 A1 | 9/2008 | Mock et al. |
| 2008/0270896 A1 | 10/2008 | Kristensson |
| 2008/0316183 A1 | 12/2008 | Westerman et al. |
| 2009/0058823 A1 | 3/2009 | Kocienda |
| 2009/0119376 A1 | 5/2009 | Bomma |
| 2009/0189864 A1 | 7/2009 | Walker et al. |
| 2010/0021871 A1 | 1/2010 | Layng et al. |
| 2010/0070908 A1 | 3/2010 | Mori et al. |
| 2010/0125594 A1 | 5/2010 | Li et al. |
| 2010/0141484 A1 | 6/2010 | Griffin et al. |
| 2010/0199226 A1 | 8/2010 | Nurmi |
| 2010/0225599 A1 | 9/2010 | Danielsson et al. |
| 2010/0235780 A1 | 9/2010 | Westerman et al. |
| 2010/0238125 A1 | 9/2010 | Ronkainen |
| 2010/0257478 A1 | 10/2010 | Longe et al. |
| 2010/0271299 A1 | 10/2010 | Stephanick et al. |
| 2011/0061017 A1 | 3/2011 | Ullrich et al. |
| 2011/0063231 A1 | 3/2011 | Jakobs et al. |
| 2011/0066984 A1 | 3/2011 | Li |
| 2011/0071834 A1 | 3/2011 | Kristensson et al. |
| 2011/0103682 A1 | 5/2011 | Chidlovskii et al. |
| 2011/0107206 A1 | 5/2011 | Walsh et al. |
| 2011/0119617 A1 | 5/2011 | Kristensson |
| 2011/0122081 A1 | 5/2011 | Kushler |
| 2011/0201387 A1 | 8/2011 | Paek et al. |
| 2011/0202834 A1 | 8/2011 | Mandryk et al. |
| 2011/0202836 A1 | 8/2011 | Badger et al. |
| 2011/0205160 A1 | 8/2011 | Song et al. |
| 2011/0208511 A1 | 8/2011 | Sikstrom et al. |
| 2011/0208513 A1 | 8/2011 | Nicks et al. |
| 2011/0210850 A1 | 9/2011 | Tran |
| 2011/0234524 A1 | 9/2011 | Longe et al. |
| 2011/0242000 A1 | 10/2011 | Bi et al. |
| 2011/0254798 A1 | 10/2011 | Adamson et al. |
| 2012/0011462 A1 | 1/2012 | Westerman et al. |
| 2012/0029910 A1 | 2/2012 | Medlock et al. |
| 2012/0036469 A1 | 2/2012 | Suraqui |
| 2012/0075190 A1 | 3/2012 | Sengupta |
| 2012/0079412 A1 | 3/2012 | Kocienda et al. |
| 2012/0098846 A1 | 4/2012 | Wun et al. |
| 2012/0113008 A1 | 5/2012 | Makinen et al. |
| 2012/0127080 A1 | 5/2012 | Kushler et al. |
| 2012/0127082 A1 | 5/2012 | Kushler et al. |
| 2012/0131035 A1 | 5/2012 | Yang et al. |
| 2012/0223889 A1 | 9/2012 | Medlock et al. |
| 2012/0242579 A1 | 9/2012 | Chua |
| 2013/0021286 A1 | 1/2013 | Sudo |
| 2013/0046544 A1 | 2/2013 | Kay et al. |

(56) References Cited

U.S. PATENT DOCUMENTS

| | | |
|---|---|---|
| 2013/0074014 A1 | 3/2013 | Ouyang et al. |
| 2013/0082824 A1 | 4/2013 | Colley |
| 2013/0120266 A1 | 5/2013 | Griffin et al. |
| 2013/0135209 A1 | 5/2013 | Zhai et al. |
| 2013/0176228 A1 | 7/2013 | Griffin et al. |
| 2013/0205242 A1 | 8/2013 | Colby |
| 2013/0212515 A1 | 8/2013 | Eleftheriou |
| 2014/0098023 A1 | 4/2014 | Zhai et al. |
| 2014/0317547 A1 | 10/2014 | Bi et al. |

FOREIGN PATENT DOCUMENTS

| | | |
|---|---|---|
| EP | 1603014 A1 | 7/2005 |
| EP | 1860576 A1 | 11/2007 |
| WO | 2004066075 A2 | 8/2004 |
| WO | 2007017660 A2 | 2/2007 |
| WO | 2007035827 A2 | 3/2007 |
| WO | 2008013658 A2 | 1/2008 |
| WO | 2011113057 A1 | 9/2011 |

OTHER PUBLICATIONS

"7 Swype keyboard lips for better Swyping," by Ed Rhee, found at http://howto.cnel.com/8301-11310_39-20070627-285/7-swype-keyboard-lips-for-belter-swyping/, posted Jun. 14, 2011, 5 pp.

"Advanced tips for Swype," found at www.swype.com/tips/advanced-tips/, downloaded Aug. 20, 2012, 3 pp.

"Android OS—Language & keyboard settings," found at support.google.com/ics/nexus/bin/answer.py?hl=en&answer=168584, downloaded Jun. 4, 2012, 3 pp.

"Avoid iPhone navigation and typing hassles," by Ted Landau, Dec. 28, 2007, found at www.macworld.com/article/1131264/tco_iphone.html, 9 pp.

"Dasur Pattern Recognition Ltd. SlideiT Keyboard—User Guide," Jul. 2011, found at hllp:I/www.mobiletextinput.com/App_Open/Manuai/SiideiT_UserGuide%5BEnglish%5Dv4.0.pdf, 21 pp.

"Hey Apple, What the Next iPhone Really, Really Needs Is a Much Better Keyboard," by Natasha Lomas, downloaded Apr. 22, 2013, from techcrunch.com/2013/04/21/the-iphone-keyboard-stinks/?, 6 pp.

"How to Type Faster with the Swype Keyboard for Android—How-To Geek." found at www.how1ogeek.com/1 06643/how-to-type-faster-with-the-swype-keyboard-for-android/, downloaded Jun. 4, 2012, 13 pp.

"Keymonk Keyboard Free-Android Apps on Google Play, Description," found at https:I/play.google.com/slore/apps/delails?id=com.keymonk.lalin&h1=en, downloaded Oct. 3, 2012, 2 pp.

"Keymonk Keyboard Free-Android Apps on Google Play, Permissions," found at hllps:l/play.google.com/slore/apps/delails?id=com.keymonk.lalin&hl=en, downloaded Oct. 3, 2012, 2 pp.

"Keymonk Keyboard Free-Android Apps on Google Play, User Reviews," found at https ://play. google.com/ store/apps/ details ?id=com.keymonk.latin&hl =en, downloaded Oct. 3, 2012, 2 pp.

"Keymonk—The Future of Smartphone Keyboards," found at www.keymonk.com, downloaded Sep. 5, 2012, 2 pp.

"Nuance Supercharges Swype, Adds New Keyboard Options, XT9 Predictive Text, and Dragon-Powered Voice Input," found at http:/Itechcrunch.com/2012/06/20/nuance- supercharges-swype-adds-new-keyboard -options-xt9-predictive-text -and -dragon- powered-voice-input/, downloaded Jun. 4, 2012, 2 pp.

"Sensory Software—Text Chat, found at www.sensorysoftware.com/textchat.html," downloaded Jun. 4, 2012, 3 pp.

"Shape Writer Keyboard allows you to input on Android the same experience with on PC, Android forums," found at talkandroid.com/ .../2767-shapewriter-keyboard-allows-you- input-android-same-experience-pc.html, last updated Oct. 25, 2009, 3 pp.

"ShapeWriter Research Project home page," accessed May 25, 2012, found at http://www.almaden.ibm.com/u/zhai/shapewriter_research.htm, 12 pp.

Keymonk Keyboard Free—Android Apps on Google Play, What's New, found at https://play.google.com/store/apps/details?id=com.keymonk.latin&hl=en, downloaded Oct. 3, 2012, 2 pp.

"ShapeWriter vs Swype Keyboard, DroidForums.net," found at www.droidforums.nel/forum/droid-applications/48707-shapewriter-vs-swype-keyboard.hlml, last updated Jun. 1, 2010, 5 pp.

"Split Keyboard for iPad [Concept]," by Skipper Eye, Apr. 23, 2010, found at http://www.redmondpie.com/splil-keyboard-for-ipad-9140675/, 6 pp.

"Split Keyboard for Thumb Typing Coming to iPad with iOS 5," by Kevin Purcell, Jun. 6, 2011, found at http://www.gottabemobi 1 e.com/20 11 /06/06/spl it-keyboard-for -thumb-typing-com ing-to-ipad-with-ios-5/, 8 pp.

"SwiftKey 3 Keyboard—Android Apps on Google Play," found at https:I/play.google.com/store/apps/details?id=com.touchtype.swiftkey&hl=en. accessed on Jun. 8, 2012, 3 pp.

"SwiftKey counters Swipe with a Smarter Version Makes an In-Road Into Healthcare Market," found at http:I/ techcrunch .com/20 12/06/21/swiftkey-counters-swype-with-a-smarter -version-makes-an-in-road-into-healthcare- market/, Jun. 21, 2012, 2 pp.

"Swipe Nuance Home, Type Fast, Swipe Faster" found at http://www.swype.com/, accessed on May 25, 2012, 1 p.

"Swype—Swype Basics," found at www.swype.com/tips/swype-basics/, downloaded Jun. 8, 2012, 2 pp.

"Welcome to CooTek—TouchPal, an innovative soft keyboard," Touch Pal v1.0 for Android will Release Soon!, found at www.cootek.com/intro-android.aspx, downloaded Aug. 20, 2012, 2 pp.

"Why your typing sucks on Android, and how to fix it," by Martin Bryant, Mar. 3, 2010, found at thenextweb.com/mobile/201 0/03/03/lyping-sucks-android-fix/, 3 pp.

Advanced tips for Swype, found at www.swype.com/tips/advanced-tips/, downloaded Aug. 20, 2012, 3 pp.

Alkanhal et al., "Automatic Stochastic Arabic Spelling Correction With Emphasis on Space Insertions and Deletions," IEEE Transactions on Audio, Speech and Language Processing, IEEE Service Center, vol. 20, No. 7, Jun. 11, 2012, 6 pages.

Androidpure, Install the 4.2 Keyboard with Gesture typing from Google Play [4.0], Feb. 12, 2013, retrieved from http://www.androidpure.com/install-the-4-2-keyboard-with-gesture-typing-from-google-play-on-4-0-devices/, 3 pp.

CiteSeer, "Token Passing: a Simple Conceptual Model for Connected Speech Recognition Systems" (1989), by S.J. Young et al., found at (hltp:I/citeseerx.isl.psu.edu/viewdoc/summary?doi=10.1.1.17.7829), accessed on Apr. 30, 2012, 23 pp.

Kristensson et al., "Command Strokes with and without Preview: Using Pen Gestures on Keyboard for Command Selection," CHI Proceedings, San Jose, CA, USA, Apr. 28-May 3, 2007, 10 pp.

Williamson et al., "Hex: Dynamics and Probabilistic Text Entry," Switching and Learning LNCS 3355, pp. 333-342, 2005.

Kristensson et al,. "Shark2: A Large Vocabulary Shorthand Writing System for Pen-based Computers," UIST, vol. 6, issue 2, Oct. 24-27, 2004.

International Search Report and Written Opinion of International application No. PCT/US2014/033665, mailed Jul. 11, 2014, 13 pp.

Karch, "Typing, Copy, and Search —Chapter 3" Android Tablets Made Simple, Nov. 18, 2011, 13 pp.

Li, "Protractor: A Fast and Accurate Gesture Recognizer" CHI2010, Apr. 10-15, 2010, Atlanta, Georgia, pp. 2169-2172.

Lomas, "Hey Apple, What the Next iPhone Really, Really Needs Is a Much Better Keyboard," Apr. 22, 2013, retrieved from techcrunch.com/2013/04/21/the-iphone- keyboard-stinks/?, 6 pp.

Naseem, "A Hybrid Approach for Urdu Spell Checking," MS Thesis Submitted in Partial Fulfillment of the Requirements for the Degree of Master of Science (Computer Science) at the National University of Computer & Emerging Sciences, Nov. 2004, 44 pages.

SlideiT Soft Keyboard, SlideiT [online], First accessed on Jan. 31, 2012, retrieved from the Internet: https://play.goog le .com/store/apps/details?id=com .dasur.slideit. vt.l ite&h 1=en>, 4 pp.

SwiftKey 3 Keyboard—Android Apps on Google Play, found at web.archive.org/web/20121127141326/https://play.google.com/store/apps/details?id=com.touchtype.swiftkey&hl=en, accessed on Nov. 27, 2012, 4 pp.

(56) References Cited

OTHER PUBLICATIONS

Swiftkey, "Swiftkey 3 Keyboard" retrieved from https://play.google.com/store/apps/detais, accessed on Jul. 17, 212, 3 pp.
Swype—Swype Basics, found at www.swype.com/lips/swype-basics/, downloaded Jun. 8, 2012, 2 pp.
Tappert et al., "The State of the Art in On-Line handwriting Recognition," IEEE Transactions on Pattern Analyisis and Machine Intelligence, vol. 12, No. 8, Aug. 1990, pp. 787-808.
Wobbrock et al., "$1 Unistroke Recognizer in JavaScript," [online], first accessed on Jan. 24, 2012, retrieved from the Internet: http://depts.washington.edu/aimgroup/proj/dollar/>, 2 pp.
Wobbrock et al., "Gestures without Libraries, Toolkits or Training: A $1 Recognizer for User Inter face Prototypes," UIST 2007, Proceedings of the 2oth Annual ACM Symposium on User Interface Software and Technology, Aug. 19, 2007, pp. 159-168.
TouchPal, "TouchPal Keyboard, Feel the speed on your touchscreen," Feb. 12, 2013, retrieved from http://www.touchpal.com/en/features.html 2 pp.
Kane et al., "TruKeys: Identifying and Correcting Typing Errors for People with Motor Impairments," Proceedings of the 13th International Conference on Intelligent User Interfaces IUI, Jan. 13, 2008, 2 pages.
Prosecution History from U.S. Appl. No. 13/923,132, from Sep. 23, 2013 through Jul. 8, 2014 89 pp.
U.S. Appl. No. 14/452,035, by Yu Ouyang, filed Aug. 5, 2014.
U.S. Appl. No. 14/477,404, by Yu Ouyang, filed Sep. 4, 2014.
U.S. Appl. No. 13/734,810, by Yu Ouyang, filed Jan. 4, 2013.

\* cited by examiner

DYNAMICALLY-POSITIONED CHARACTER STRING SUGGESTIONS FOR GESTURE TYPING

This application is a Continuation of application Ser. No. 13/923,132, filed on Jun. 20, 2013, which claims the benefit of U.S. Provisional Application No. 61/814,690, filed Apr. 22, 2013, the entire content of each of which are hereby incorporated by reference.

BACKGROUND

Some computing devices (e.g., mobile phones, tablet computers, etc.) may provide a graphical keyboard as part of a graphical user interface for composing text using a presence-sensitive display (e.g., a screen). The graphical keyboard may enable a user of the computing device to enter text (e.g., an e-mail, a text message, or a document, etc.). For instance, a presence-sensitive display of a computing device may output a graphical (or "soft") keyboard that enables the user to enter data by indicating (e.g., by tapping) keys displayed at the presence-sensitive display.

In some cases, a computing device may present a continuous-gesture graphical keyboard (sometimes referred to as a "combo gesture keyboard," or "gesture keyboard") with which a user can enter a character string by performing a continuous gesture that corresponds to the character string. For example, the computing device may determine that a user has entered a character string when the computing device receives an indication of a movement of an input object (e.g., a finger or stylus) over regions of the presence-sensitive screen associated with keys for the letters of the character string. In this way, continuous-gesture graphical keyboards may allow a user to enter a character string or group of character strings with a single gesture. As such, a continuous-gesture graphical keyboard may allow the user to achieve a certain degree of input efficiency. Entry of text in this way may be referred to as "gesture typing."

Furthermore, in some cases, the computing device may output a plurality of suggested character strings in a suggestion bar positioned above the graphical keyboard. After the computing device receives an indication of a movement of an input object and an indication of a gesture termination input, the computing device may receive an indication of a tapping gesture at a position that corresponds to one of the suggested character strings. In response, the computing device may output the suggested character string in place of a previously-entered character string. Thus, if the previously-entered character string is not the character string that the user wishes to enter, the user may cause the computing device to replace the previously-entered character string with a suggested character string by performing a tapping gesture at the position within the suggestion bar that corresponds to the suggested character string.

SUMMARY

In one example, a method comprises outputting, by a computing device and for display, a virtual keyboard comprising a plurality of virtual keys. The method also comprises receiving, by the computing device, an indication of a first movement of an input object along a spatial path, the first movement detected at a presence-sensitive input device. Furthermore, the method comprises determining, by the computing device and based at least in part on a group of one or more correspondences between locations of the plurality of virtual keys and locations along the spatial path, a plurality of character strings. In addition, the method comprises, in response to determining that the first movement of the input object has ceased for at least a threshold amount of time, outputting, by the computing device, for display, the plurality of character strings. The method also comprises during a time that the plurality of character strings are displayed, receiving, by the computing device, an indication of a second movement of the input object, wherein the second movement is a continuation of the first movement. Furthermore, the method comprises selecting, by the computing device, in response to the indication of the second movement of the input object, and based at least in part on a direction of the second movement of the input object, a particular character string from the plurality of character strings.

In another example, a computing device comprises one or more processors configured to output, for display at a display device, a virtual keyboard comprising a plurality of virtual keys. The one or more processors are also configured to receive an indication of a first movement of an input object along a spatial path. Furthermore, the one or more processors are configured to determine, based at least in part on locations of the plurality of virtual keys and locations along the spatial path, a plurality of character strings. In addition, the one or more processors are configured to, in response to determining that the input object has remained at a particular location for at least a threshold amount of time during which time the computing device did not receive an indication of a gesture termination event, output for display at the display device, the plurality of character strings. The one or more processors are configured such that, during a time that the plurality of character strings are displayed, the one or more processors receive an indication of a second movement of the input object, wherein the second movement is a continuation of the first movement. In addition, the one or more processors determine, in response to the indication of the second movement of the input object, and based at least in part on a direction of the second movement of the input object, that a particular character string from the plurality of character strings is a currently-selected character string.

In another example, a computer-readable storage medium stores instructions that, when executed by one or more processors of a computing device, cause the computing device to output, for display at a display device, a graphical user interface (GUI) that includes a virtual keyboard comprising a plurality of virtual keys. Execution of the instructions also causes the computing device to receive an indication of a movement of an input object along a spatial path. In addition, execution of the instructions causes the computing device to determine, based at least in part on locations of the plurality of virtual keys and locations along the spatial path, a plurality of character strings. Furthermore, execution of the instructions causes the computing device to, in response to determining that the input object has remained at a particular location for at least a threshold amount of time during which time the computing device did not receive an indication of a gesture termination event, output for display at the display device, a suggestion element that includes the plurality of character strings. In addition, during a time that the suggestion element is displayed, execution of the instructions causes the computing device to receive an indication that the movement of the input object has resumed. Execution of the instructions also causes the computing device to determine, based at least in part on a direction of the movement of the input object after the movement of the input object resumed, that a particular character string from the plurality of character strings is a currently-selected character string. In addition, execution of the instructions also causes the computing device to output, for display at the display device, the suggestion element such that the currently-selected character string is visually differentiated from other character strings in the suggestion element. Execution of the instructions also causes the computing device to output, in response to receiving an indication of a gesture termination event, the currently-selected character string for display in a text entry area of the GUI.

One or more examples are set forth in the accompanying drawings and the description below. Other features, objects, and advantages will be apparent from the description, drawings, and claims.

DETAILED DESCRIPTION

In some implementations, a computing device may receive indications of a movement of an input object (e.g., a finger or stylus) as the input object moves along a spatial path. In response to receiving the indications of the movement of the input object, the computing device may determine a plurality of suggested character strings (e.g., suggested words) that correspond to the movement of the input object. If the computing device determines that the input object has remained at substantially the same location for at least a given amount of time, the computing device may output, for display by a display device, the plurality of suggested character strings. The positions at which the display device displays the plurality of suggested character strings may depend on a current position of the input object.

While the display device is displaying the plurality of suggested character strings, the computing device may update, based at least in part on a direction of a continued movement of the input object, which suggested character string from among the plurality of suggested character strings is currently selected. For example, the computing device may update, based at least in part on whether the continued movement of the input object is rightward or leftward, which suggested character string from among the plurality of suggested character strings is the currently-selected suggested character string. The computing device may output, for display in a text entry area, the currently-selected suggested character string in response to receiving an indication of a gesture termination event. In this way, the user may be able to select one of the suggested character strings without performing a separate tapping gesture at a suggested character string in a suggestion bar.

Figure 1:
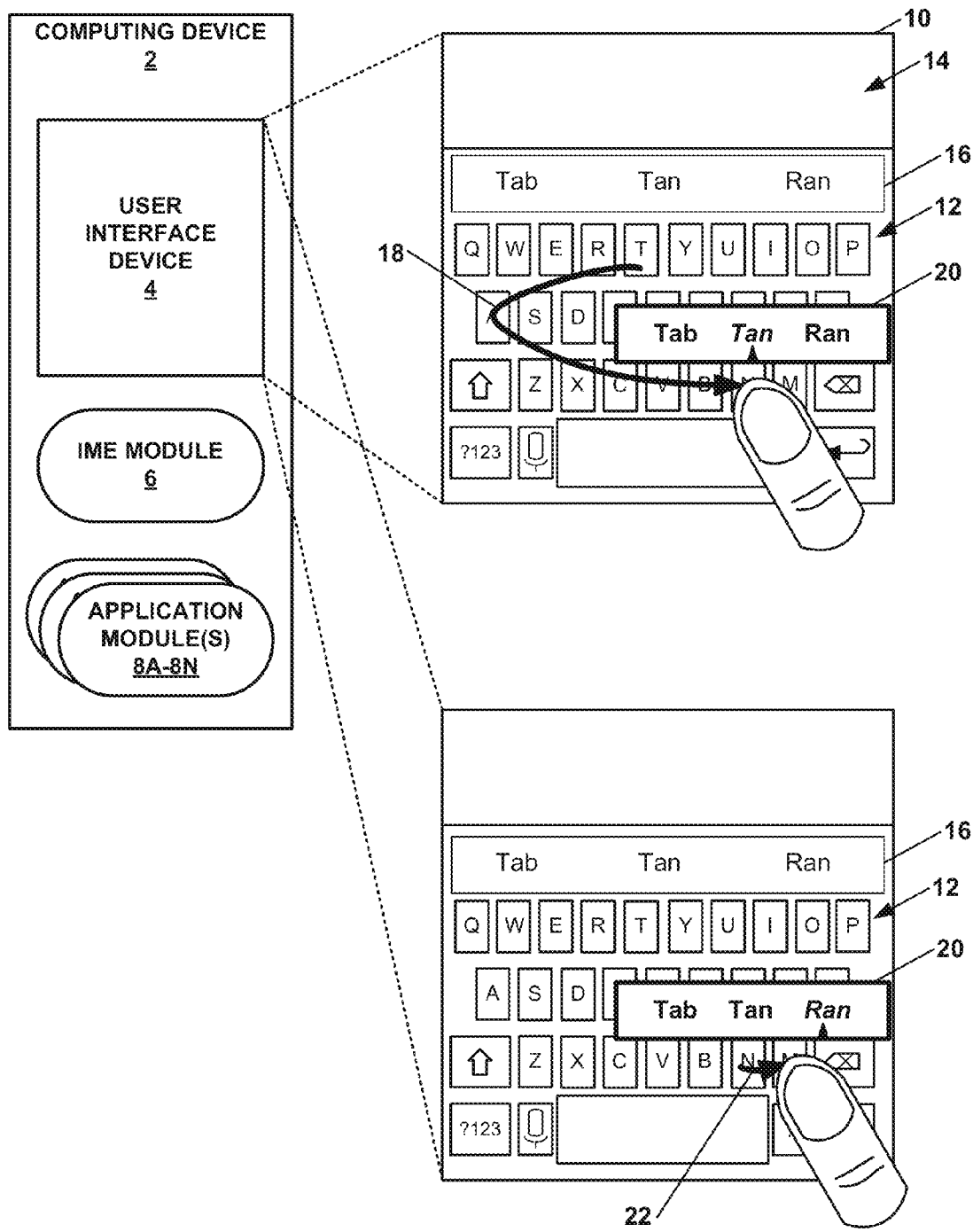
FIG. 1 is a conceptual diagram illustrating an example computing device, in accordance with one or more aspects of the present disclosure.

FIG. 1 is a conceptual diagram illustrating an example computing device 2 in accordance with one or more techniques of this disclosure. Computing device 2 may be various types of computing devices. For example, computing device 2 may be a mobile device, such as a mobile telephone, a tablet computer, a notebook or laptop computer, a personal media player, a portable gaming device, or another type of computing device designed for mobility. In other examples, computing device 2 may be other types of computing devices, such as desktop computers, point of sale devices, televisions, gambling devices, appliances, in-car computers, and other types of devices. Furthermore, in some examples, the term "computing device" may refer to a set of one or more integrated circuits, such as microprocessors, chipsets, and so on.

In the example of FIG. 1, computing device 2 includes at least one user interface (UI) device 4. UI device 4 may comprise a display device that displays graphical data and may also comprise a presence-sensitive input device that detects the presence of one or more input objects, such as fingers or styli. Because UI device 4 may display graphical data and may detect the presence of one or more input objects, UI device 4 may be referred to as a presence-sensitive display device. UI device 4 may be implemented using various technologies. For example, UI device 4 may be implemented using a resistive touchscreen, a surface acoustic wave touchscreen, a capacitive touchscreen, a projective capacitance touchscreen, an acoustic pulse recognition touchscreen, or another touchscreen technology. In some examples, UI device 4 may be able to detect the presence of an input object without the input object physically touching UI device 4. For example, in some such examples, UI device 4 may be able to detect the presence of the input object when the input object is within a particular space.

UI device 4 may be operatively coupled to computing device 2 in various ways. For example, UI device 4 may be integrated into a housing of computing device 2 and may be connected to computing device 2 via one or more internal connectors. In another example, UI device 4 may be external to a housing of computing device 2 and may communicate with computing device 2 via one or more external cables and/or communication networks.

Although the example of FIG. 1 assumes that UI device 4 is a presence-sensitive display device, the techniques of this disclosure are not so limited. In other examples, UI device 4 may be a display device that does not detect the presence of input objects. In some such examples, another device (e.g., one or more cameras, motion sensors, and/or other types of sensors) may detect the presence of input objects.

As shown in FIG. 1, computing device 2 outputs a graphical user interface (GUI) 10 for display at UI device 4. In general, a GUI may be a type of user interface that allows a user to use images to interact with a computing device. GUI 10 may include a virtual keyboard 12. Virtual keyboard 12 may include a set of virtual keys. At least some of the virtual keys are associated with one or more characters. In the example of FIG. 1, the virtual keys are arranged according to the QWERTY format.

In addition, GUI 10 may include a text entry area 14. Computing device 2 may output text for display in text entry area 14 in response to receiving indications of user input. In some examples, text entry area 14 may be a field or area where user-entered text appears. In addition, GUI 10 may include a suggestion bar 16. Suggestion bar 16 may include a set of suggested character strings. Suggestion bar 16 may be positioned within GUI 10 above virtual keyboard 12.

Computing device 2 may include an input method editor (IME) module 6. IME module 6 may receive indications of user input (i.e., user input indications). The user input indications may comprise data that indicate user input received by computing device 2 or another device. IME module 6 may receive various types of user input indications. For example, IME module 6 may receive user input indications that indicate presses and releases of keys on a physical keyboard. In another example, IME module 6 may receive user input indications that indicate movements of one or more input objects. In this example, UI device 4 or another device may detect the movements of the one or more input objects. In another example, IME module 6 may receive user input indications that correspond to tapping gestures at various locations, such as virtual keys on virtual keyboard 12. In this example, the user input indications may correspond to tapping gestures at portions of a display device (e.g., UI device 4) that display virtual keys associated with characters.

In another example, IME module 6 may receive a user input indication that corresponds to a gesture termination event. In this example, the gesture termination event may occur when a presence-sensitive input device (such as UI device 4) is no longer able to detect the presence of an input object. In some examples, a presence-sensitive input device may be no longer able to detect the presence of an input object when a user lifts the input object off of the presence-sensitive input device. In other examples, IME module 6 may determine that a user input indication corresponds to a gesture termination event when the user input indication indicates the occurrence of a particular movement of one or more input objects.

IME module 6 may determine that particular user input indications correspond to strings of one or more characters (i.e., character strings). In various examples, IME module 6 may determine that particular user input indications correspond to character strings that match words in various languages, such as English, Russian, French, Japanese, Korean, Chinese, Hindi, Arabic, and so on.

In the example of FIG. 1, computing device 2 also includes application module(s) 8A-8N (collectively, "application module(s) 8"). Execution of instructions in application module(s) 8 may cause computing device 2 to provide various applications (e.g., "apps"). In some examples, IME module 6 may output the character strings determined by IME module 6 to one or more of application module(s) 8. Application module(s) 8 may process the character strings received from IME module 6. In some examples, an application module may output, in response to receiving a character string from IME module 6, the character string for display by a display device, such as UI device 4.

Furthermore, when IME module 6 receives one or more user input indications, IME module 6 may determine whether the one or more user input indications correspond to a movement of an input object along a spatial path. The spatial path may be a course along which the input object moves. During the movement of the input object along the spatial path, IME module 6 does not receive an indication of a gesture termination event. In some examples, the spatial path may be a substantially 2-dimensional path, e.g., a path along a substantially flat surface. For instance, the spatial path may be across a substantially flat surface of UI device 4 at which virtual keyboard 14 is displayed. In the example of FIG. 1, a spatial path 18 indicates a movement of a finger along a spatial path across a surface of UI device 4. In other examples, the spatial path may be a 3-dimensional path, i.e., a path through a 3-dimensional space.

In response to determining that one or more user input indications correspond to a movement of an input object along a spatial path, IME module 6 may determine, based at least in part on a group of one or more correspondences between locations of the plurality of virtual keys of virtual keyboard 14 and locations along the spatial path, a plurality of character strings. For instance, if locations along the spatial path correspond to locations of the virtual keys for the letters "t," "a," and "n," IME module 6 may determine that the words "tab," "tan," "tam," "ran," and "yam" correspond to the movement of the input object. IME module 6 may rank the character strings such that, for each respective character string in the plurality of character strings, the respective character string has a higher rank than another character string if the respective character string is more likely to be the character string that the user wishes to input than the other character string, given the spatial path of the input object and potentially other information. In response to receiving an indication of a gesture termination input, computing device 2 may output, for display, the highest-ranked character string. In this disclosure, "gesture typing" may refer to entry of text in this way.

Although not shown in the example of FIG. 1, IME module 6 may also output, for display, a so-called floating preview element. IME module 6 may determine a position at which the floating preview element is displayed based at least in part on a current position of an input object. IME module 6 may output the floating preview element at updated locations as the input object moves, hence the name "floating" preview element. In some examples, the floating preview element may be semi-transparent such that portions of virtual keyboard 14 or other GUI elements may be visible through the floating preview element. The floating preview element may include one of the determined character strings. For instance, the floating preview element may include the highest-ranked one of the determined character strings. If IME module 6 receives an indication of a gesture termination event, computing device 2 may output, for display in text entry area 14, the character string shown in the floating preview element. For instance, if the character string shown in the floating preview element is "tax," computing device 2 may output, for display in text entry area 14, the character string "tax." Hence the character string shown in the floating preview element may serve as a "preview" of the character string that computing device 2 will output in text entry area 14 if IME module 6 receives an indication of a gesture termination event. As discussed above, IME module 6 may output the character string to one of application modules 8 which may, in turn, cause computing device 2 to output the character string for display by a display device, such as UI device 4.

IME module 6 may output, for display, at least a portion of the determined character strings in suggestion bar 16. This disclosure may refer to the character strings displayed in suggestion bar 16 as suggested character strings. As shown in the example of FIG. 1, IME module 6 outputs the suggested character strings "Tab," "Tan," and "Ran" in suggestion bar 16 in response to the movement of a finger along spatial path 18. As indicated above, when IME module 6 receives an indication of a gesture termination event, computing device 2 may output, for display in text entry area 14, the character string currently shown in the floating preview element. However, this character string may not be the character string that a user wishes to enter. Accordingly, after IME module 6 receives the indication of the gesture termination event and prior to receiving additional indications of user input to input text, IME module 6 may receive a user input indication that corresponds to a selection of a suggested character string in suggestion bar 16. In response to receiving the user input indication that corresponds to the selection of one of the suggested character strings in suggestion bar 16, computing device 2 may output, in text entry area 14, the selected suggested character string in place of the previously-entered character string. For instance, computing device 2 may output, for display in text entry area 14, the character string of the selected suggestion element in place of the character string displayed by the floating preview element. In this way, by selecting one of the suggested character strings from suggestion bar 16, the user may be able to replace incorrect character strings with correct character strings.

In accordance with the techniques of this disclosure, IME module 6 may determine whether the movement of an input object has ceased for at least a threshold amount of time. In other words, IME module 6 may detect that an input object has started moving, but then has remained at substantially the same position for a period of time without the occurrence of a gesture termination event. In the example of FIG. 1, IME module 6 may receive indications that an input object (e.g., a finger) has moved along spatial path 18 and has paused (i.e., ceased moving, remained at, etc.) at a location associated with the virtual key for the character "n." In the example of FIG. 1, the input object may remain at the location associated with the virtual key for the character "n" without being lifted away from a surface of UI device 4 (i.e., without the occurrence of a gesture termination event).

In various examples, the threshold amount of time may have various durations. For example, the threshold amount of time may be 150 milliseconds. In other examples, the threshold amount of time may be 100 milliseconds, 200 milliseconds, or another amount of time.

In response to determining that the movement of the input object has ceased for at least the threshold amount of time, IME module 6 may output, for display, one or more floating suggestion elements. IME module 6 may determine, based at least in part on a current position of the input object, location of a display device at which the one or more floating suggestion elements are to be displayed. That is, depending on the current position of the input object, the floating suggestion elements may be displayed at different locations, hence the name "floating" suggestion elements. For the same reason, this disclosure may refer to the floating suggestion elements as "dynamically-positioned suggestion elements." In some examples, the one or more floating suggestion elements are semi-transparent, such that portions of virtual keyboard 12 or other GUI elements may be visible through the one or more floating suggestion elements.

In some examples, IME module 6 may output a single floating suggestion element that includes a plurality of character strings from the determined plurality of character strings. In the example of FIG. 1, IME module 6 outputs, for display, a floating suggestion element 20 that includes the character strings "Tab," "Tan," and "Ran." In this example, IME module 6 may determine that "Tab," "Tan," and "Ran" are the character strings that the user was most likely trying to enter, given the movement of the input object along spatial path 18. In other examples, such as that shown in the example of FIGS. 6A and 6B (which are described in detail elsewhere in this disclosure), IME module 6 outputs, for display, a plurality of floating suggestion elements, each of which include a single character string. Thus, by outputting a single floating suggestion element that includes multiple character strings or by outputting multiple floating suggestion elements that each include a single character string, IME module 6 may output, for display, a plurality of character strings in response to determining that the movement of the input object has ceased for at least the threshold amount of time. Because IME module 6 may determine the positions of the floating suggestion elements based on a current position of the input object, this disclosure may refer to the character strings in the one or more floating suggestion elements as "dynamically-positioned character string suggestions." The character strings in the one or more floating suggestion elements may or may not match the suggested character strings currently displayed in suggestion bar 16.

When IME module 6 outputs the one or more floating suggestion elements for display, one of the character strings displayed in the one or more floating suggestion elements may be a currently-selected character string. For instance, a highest ranking character string displayed in the one or more floating suggestion elements may be the currently-selected character string by default. The currently-selected character string may be visually differentiated from other ones of the character strings displayed in the one or more floating suggestion elements. In the example of FIG. 1, the currently-selected character string ("Tan") is displayed in italics and a triangular indicator is positioned below the currently-selected character string. In other examples, the currently-selected character string may be visually differentiated in other ways. For example, a color or font of the currently-selected character string may be different than colors or fonts of other character strings displayed in the one or more floating suggestion elements.

During a time that the one or more floating suggestion elements are displayed, IME module 6 may receive an indication of a second movement of the input object. The second movement may be a continuation of the previous movement of the input object. That is, IME module 6 may receive an indication that the input object has started moving again (i.e., that movement of the input object has resumed) without receiving an indication of a gesture termination event between the time the movement of the input object ceased and the time the movement of the input object resumed.

In the example of FIG. 1, IME module 6 may receive one or more indications that an input object has moved along path 18 and then paused at a location corresponding to the virtual key for the character "n." IME module 6 may then receive one or more indications that movement of the input object has resumed. In the example of FIG. 1, when the movement of the input object resumes, IME module 6 may receive one or more indications that the input object has moved along a path 22. Path 22 may be a continuation of path 18.

In response to receiving the indication that movement of the input object has resumed, IME module 6 may output, for display, the one or more floating suggestion elements such that a different one of the character strings displayed by the one or more floating suggestion elements is the currently-selected character string. In the example of FIG. 1, "Tan" is the currently-selected character string prior to IME module 6 receiving the indication of the continued movement of the input object. Furthermore, in the example of FIG. 1, IME module 6 may, in response to receiving the indication of the continued movement of the input object along path 22, output, for display, floating suggestion element 20 such that "Ran" is the currently-selected character string instead of "Tan."

IME module 6 may determine, based at least in part on a direction of the continued movement of the input object, which of the character strings displayed in the one or more floating suggestion elements is to become the new currently-selected character string. In the example of FIG. 1, when "Tan" is the currently-selected character string and the continued movement of the input object is rightward, IME module 6 may determine that "Ran" is to become the new currently-selected character string. Furthermore, in the example of FIG. 1, when "Tan" is the currently-selected character string and the continued movement of the input object is leftward, IME module 6 may determine that "Tab" is to become the new currently-selected character string. Similarly, in the example of FIG. 1, when "Ran" is the currently-selected character string and the continued movement of the input object is leftward, IME module 6 may determine that "Tan" is to become the new currently-selected character string. In this way, IME module 6 may select, in response to the indication of the continued movement of the input object, and based at least in part on a direction of the continued movement of the input object, a particular character string from the plurality of character strings displayed in the one or more floating suggestion elements.

If IME module 6 receives an indication of a gesture termination event while the one or more floating suggestion elements are displayed in GUI 10, computing device 2 may output the currently-selected character string for display in text entry area 14 of GUI 10. Furthermore, if IME module 6 receives an indication of a gesture termination event while the one or more floating suggestion elements are displayed in GUI 10, IME module 6 may output, for display, GUI 10 such that GUI 10 no longer includes the one or more floating suggestion elements. In other words, IME module 6 may hide the one or more floating suggestion elements such that the one or more floating suggestion elements are no longer displayed in GUI 10. In the example of FIG. 1, if IME module 6 receives an indication of the gesture termination event while "Ran" is the currently-selected character string, computing device 2 may output, for display in text entry area 14, the character string "Ran."

In this way, computing device 2 may output, for display, a virtual keyboard comprising a plurality of virtual keys. Furthermore, computing device 2 may receive an indication of a first movement of an input object along a spatial path. The first movement may be detected at a presence-sensitive input device, such as UI device 4. Computing device 2 may determine, based at least in part on a group of one or more correspondences between locations of the plurality of virtual keys and locations along the spatial path, a plurality of character strings. In response to determining that the first movement of the input object has ceased for at least a threshold amount of time, computing device 2 may output, for display, the plurality of character strings. During a time that the plurality of character strings are displayed, computing device 2 may receive an indication of a second movement of the input object. The second movement may be a continuation of the first movement. Computing device 2 may select, in response to the indication of the second movement of the input object, and based at least in part on a direction of the second movement of the input object, a particular character string from the plurality of character strings.

Selecting a character string from among the character strings displayed in the one or more floating suggestion elements may be easier for the user than selection the character string from among the suggested character strings in suggestion bar 16. When a user is inputting text by performing sliding gestures with an input object, the user's eyes are likely to be focused on the input object, and not focused on other parts of GUI 10. Because the one or more floating suggestion elements are displayed closer to the input object than suggestion bar 16, the user may be more likely to notice and use the floating suggestion elements than the suggested character strings in suggestion bar 16. Hence, the floating suggestion elements may save the user time and frustration.

Furthermore, selecting a character string from among the character strings displayed in the one or more floating suggestion elements may obviate the need for the user to perform a separate tapping gesture at one of the suggested character strings in suggestion bar 16. Some users may find the performance of tapping gestures at suggestion bar 16 to be disruptive. For example, if the user wishes to enter the second- or third-highest ranked character string, the user may have to use suggestion bar 16 to choose the second- or third-highest ranked character string. This extra selection process may break the workflow of gesture typing and may distract the user's attention away from the gesture typing.

Figure 2:
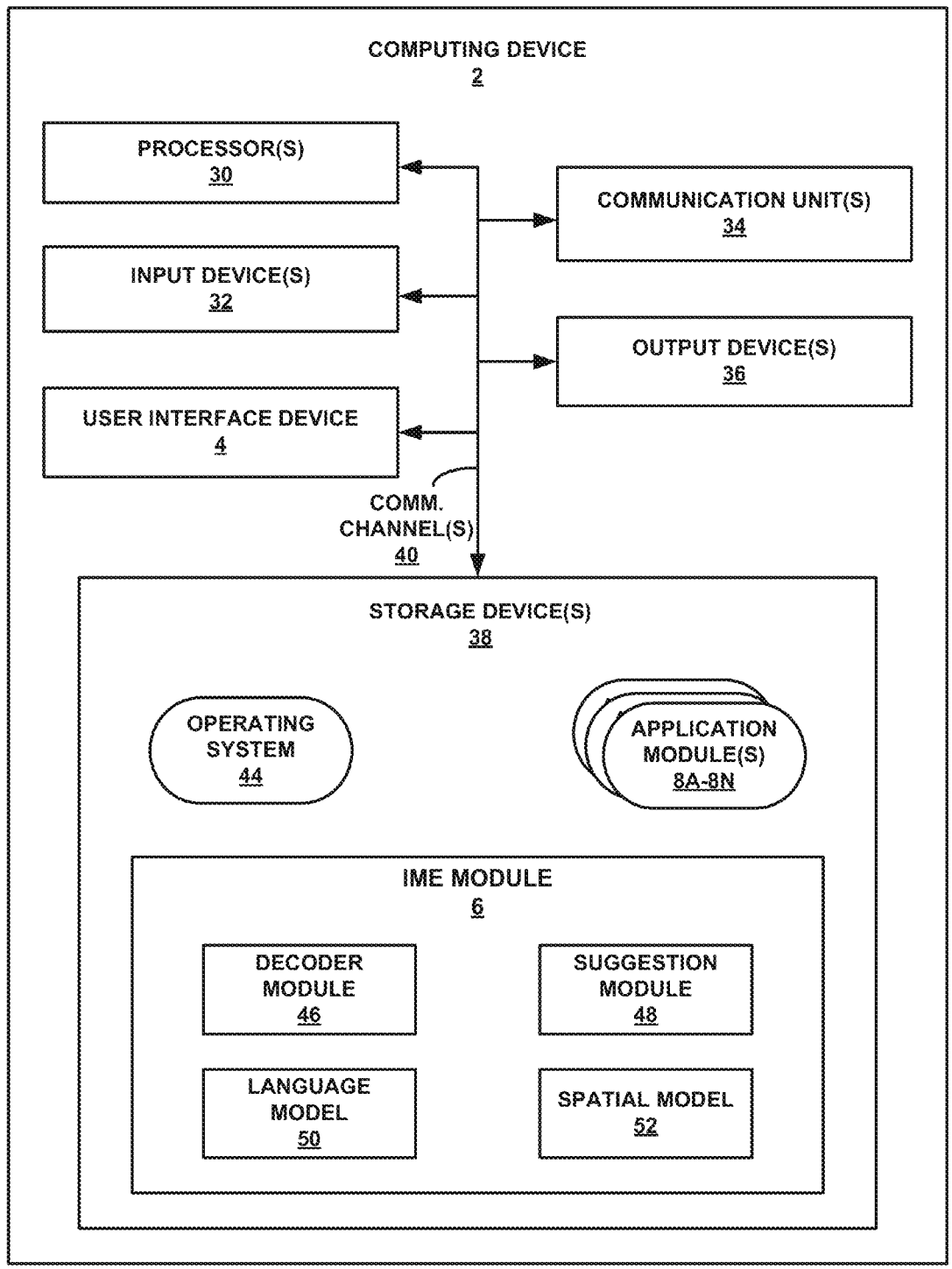
FIG. 2 is a block diagram illustrating an example computing device, in accordance with one or more aspects of the present disclosure.

FIG. 2 is a block diagram illustrating an example configuration of computing device 2, in accordance with one or more aspects of this disclosure. For purposes of illustration, the discussion of FIG. 2 and the following figures includes continued references to FIG. 1. However, the techniques of this disclosure are not so limited. FIG. 2 illustrates only one particular example of computing device 2, and many other example configurations of computing device 2 exist.

As shown in the example of FIG. 2, computing device 2 includes one or more processors 30, one or more input devices 32, one or more communication units 34, one or more output devices 36, one or more storage devices 38, one or more communication channels 40, and UI device 4. Computing device 2 may include many other components. For example, computing device 2 may include physical buttons, microphones, speakers, communication ports, and so on.

Communication channel(s) 40 may interconnect each of the components 30, 32, 34, 36, 38, and 4 for inter-component communications (physically, communicatively, and/or operatively). In some examples, communication channel(s) 40 may include a system bus, a network connection, an inter-process communication data structure, or any other method for communicating data.

Storage device(s) 38 may store information required for use during operation of computing device 2. Storage device(s) 38, in some examples, have the primary purpose of being a short term and not a long-term computer-readable storage medium. Storage device(s) 38 may be volatile memory and may therefore not retain stored contents if powered off. Examples of volatile memories may include random access memories (RAM), dynamic random access memories (DRAM), static random access memories (SRAM), and other forms of volatile memories known in the art. Storage device(s) 38 may further be configured for long-term storage of information as non-volatile memory space and retain information after power on/off cycles. Examples of non-volatile memory configurations may include magnetic hard discs, optical discs, floppy discs, flash memories, or forms of electrically programmable memories (EPROM) or electrically erasable and programmable (EEPROM) memories. In some examples, processor(s) 30 on computing device 2 read and may execute instructions stored by storage device(s) 38.

Computing device 2 may include one or more input device(s) 32 that computing device 2 uses to receive user input. Examples of user input include tactile, audio, and video user input. Input device(s) 32 may include presence-sensitive screens, touch-sensitive screens, mice, keyboards, voice responsive systems, video cameras, microphones or other types of devices for detecting input from a human or machine.

Communication unit(s) 34 may enable computing device 2 to send data on and receive data from a communications network, such as a local area network or the Internet. In some examples, communication unit(s) 34 may include wireless transmitters and receivers that enable computing device 2 to communicate wirelessly with the communications network. Examples of communication unit(s) 34 may include network interface cards, Ethernet cards, optical transceivers, radio frequency transceivers, or other types of devices that are able to send and receive information. Other examples of such communication units may include Bluetooth, 3G, and WiFi radios, Universal Serial Bus (USB) interfaces, etc.

Output device(s) 36 may generate output. Examples of output include tactile, audio, and video output. Output device(s) 36 may include presence-sensitive screens, sound cards, video graphics adapter cards, speakers, cathode ray tube (CRT) monitors, liquid crystal displays (LCD), or other types of devices for generating output.

Processor(s) 30 may read instructions from storage device(s) 38 and may execute instructions stored by storage device(s) 38. Execution of the instructions by processor(s) 30 may configure or cause computing device 2 to provide at least some of the functionality ascribed in this disclosure to computing device 2. As shown in the example of FIG. 2, storage device(s) 38 include computer-readable instructions associated with operating system 44, IME module 6, and application modules 8A-8N. Execution of instructions associated with operating system 44 may cause computing device 2 to perform various functions to manage hardware resources of computing device 2 and to provide various common services for other computer programs. Execution of instructions associated with application modules 8 may cause computing device 2 to provide various applications (e.g., "apps").

In the example of FIG. 2, IME module 6 includes a decoder module 46, a suggestion module 48, a language model 50, and a spatial model 52. Execution of instructions in these modules may cause computing device 2 to provide the functionality ascribed in this disclosure to these modules.

Decoder module 46 may receive user input indications from operating system 44. The user input indications may be indications of user inputs received by UI device 4, input device(s) 32, and/or other devices. The user input indications may correspond to gesture initiation events, gesture termination events, movement indications, and/or indications of other types of user inputs. A gesture initiation event may occur when a presence-sensitive input device (e.g., UI device 4) initially detects the presence of an input object at a particular location. A gesture termination event may occur when a presence-sensitive input device (e.g., UI device 4) is no longer able to detect the presence of an input object or may indicate that an input object has moved away from an applicable surface or plane. A movement indication may indicate a movement of an input object on an applicable surface or plane, such as UI device 4. Decoder module 46 may determine that a tapping gesture has occurred if a gesture initiation event indication occurs for an input object, followed by a gesture termination event for the input object without a significant intervening movement indication for the input object.

Decoder module 46 may determine that a sliding gesture has occurred if a gesture initiation event occurs for an input object, followed by a movement indication for the input object, followed by a gesture termination event for the input object. The movement indication may indicate a movement of the input object along a spatial path. In some examples, the spatial path may be 2-dimensional path across portions of a display device (e.g. UI device 4) that display virtual keys of a virtual keyboard (e.g., virtual keyboard 14).

Decoder module 46 may determine, based at least in part on correspondences between locations of virtual keys and locations along the spatial path, a plurality of character strings. Decoder module 46 may perform various operations to determine the set of one or more character strings. For example, decoder module 46 may use one or more finite state transducers (FSTs) to determine the candidate strings and their scores.

After decoder module 46 determines the set of one or more candidate strings and their scores, suggestion module 48 may select, based at least in part on the scores of the candidate strings, at least a portion of the candidate strings. Suggestion module 48 may then output the selected candidate strings in suggestion bar 16. In other words, suggestion module 48 may populate the selected candidate strings into suggestion bar 16. Suggestion module 48 may determine, based at least in part on one or more user input indications, that a user has selected one of the suggested character strings in suggestion bar 16. In response, suggestion module 48 may output, for display at a display device (e.g., UI device 4), a portion of the displayed text in place of the candidate string associated with the selected suggestion element. For instance, suggestion module 48 may output one or more words in place of a previously-entered character string.

Computing device 2, in some examples, includes a language model 50. Language model 50 may include a lexicon. In some examples, a lexicon may include a listing of words and may include additional information about the listed words. A lexicon may be represented by a range of data structures, such as an array, a list, and/or a tree. For example, language model 50 may include a lexicon stored in a trie data structure. A lexicon trie data structure may contain a plurality of nodes, each node may represent a letter. The first node in a lexicon trie may be called the entry node and may not correspond to a letter. In other examples, the entry node may correspond to a letter. Each node may have one or more child nodes. For instance, the entry node may have twenty-six child nodes, each corresponding to a letter of the English alphabet.

A subset of the nodes in a lexicon trie may each include a flag which indicates that the node is a terminal node. Each terminal node of a lexicon trie may indicate a complete word (e.g., a candidate character string). The letters indicated by the nodes along a path of nodes from the entry node to a terminal node may spell out a word indicated by the terminal node. In some examples, language model 50 may be a default dictionary installed on computing device 2. In other examples, language model 50 may include multiple sources of lexicons, which may be stored at computing device 2 or stored at one or more remote computing devices and are accessible to computing device 2 via one or more communication channels. In some examples, language model 50 may be implemented in the firmware of computing device 2.

Language model 50 may include language model frequency information such as n-gram language models. An n-gram language model may provide a probability distribution for an item $x_i$ (letter or word) in a contiguous sequence of items based on the previous items in the sequence (i.e., $P(x_i|x_i-(n-1), \ldots, x_i-1)$). For instance, a bigram language model (an n-gram model where n=2), may provide a probability that the letter "i" follows the sequence "fr". In some examples, language model 50 includes a lexicon trie with integrated language model frequency information. For instance, each node of the lexicon trie may include a representation of a letter and a probability value.

As decoder module 46 receives indications of a movement of an input object, decoder module 46 may incrementally determine the character string indicated by the gesture. In one example, a user may desire to enter text (e.g., the character string "friend") into text entry area 14 of GUI 10. In one example, the movement of the input object may be a continuous motion in which the input object is detected by UI device 4 (or other presence-sensitive input device) throughout the movement. In a different example, the user may move his/her finger into proximity with UI device 4 such that the finger is temporarily detected by UI device 4 (or other presence-sensitive input device) and then the user's finger moves away from UI device 4 such that the finger is no longer detected. The gesture may include a plurality of portions. In some examples, the gesture may be divided into portions with substantially equivalent time durations. Where the gesture includes a plurality of portions, the gesture may include a final portion which may be portion of the gesture detected prior to detecting that the gesture is complete. For instance, a portion of the gesture may be designated as the final portion where the user moves his/her finger out of proximity with UI device 4 such that the finger is no longer detected.

While the user performs the gesture to input a character string, operating system 44 may receive data indicating a movement of an input object along a spatial path. The user may perform the gesture by tracing the gesture path through or near keys of the graphical keyboard that correspond to the characters of the desired word (i.e., the characters represented by an "F" key, "R" key, and "I" key). Operating system 44 may send data that indicate the spatial path to decoder module 46. In some examples, operating system 44 incrementally sends data indicating the movement to decoder module 46 as the gesture path is detected by UI device 4 and received by operating system 44. For instance, operating system 44 may send a stream of coordinate pairs indicating the movement along the spatial path to decoder module 46 as UI device 4 detects the movement.

In response to receiving the indication of the movement of the input object, decoder module 46 may determine a candidate character string. A candidate character string may be a character string suggested to the user that is composed of a group of characters corresponding to keys indicated by the spatial path. Decoder module 46 may determine the group of keys based at least in part on the gesture path and a lexicon. Decoder module 46 may determine a candidate character string by determining a group of alignment points traversed by the gesture path, determining respective cost values for each of at least two keys of the plurality of keys, and comparing the respective cost values for at least each of at least two keys of the plurality of keys, as further described below.

An alignment point may be a point along the gesture path may indicate a key of the plurality of keys. An alignment point may include one or more coordinates corresponding to the determined position of the alignment point. For instance, an alignment point may include Cartesian coordinates corresponding to a point in GUI 10.

In some examples, decoder module 46 determines the group of alignment points traversed by the gesture path based on a plurality of features associated with the gesture path. The plurality of features associated with the gesture path may include a length of a segment of the gesture path. For instance, decoder module 46 may determine the length along the gesture segment from a previous alignment point and the current alignment point. For better alignments, the length may more closely approximate the straight-line distance between to two corresponding keyboard letters.

In another example, decoder module 46 may determine a direction of a segment from a first point to a second point of the gesture path to determine the group of alignment points. For better alignments, the direction of the segment will more closely approximate the direction of a straight line from between two corresponding keyboard letters.

In some examples, decoder module 46 may determine respective cost values for each of at least two virtual keys of the plurality of virtual keys included in the virtual keyboard. Each of the respective cost values may represent a probability that an alignment point indicates a key. In some examples, the respective cost values may be based on physical features of the gesture path, the alignment point, and/or the key. For instance, the respective cost values may be based on the physical location of the alignment point with reference to the physical location of the key.

Furthermore, decoder module 46 may use one or more spatial models, e.g., spatial model 52, to determine a candidate character string. Decoder module 46 may use spatial model 52 to determine one or more probabilities that a particular key of the graphical keyboard has been selected by the user based on alignment points. In some examples, spatial model 52 includes a bivariate Gaussian model for a particular key. The bivariate Gaussian model for a key may include a distribution of coordinates (e.g., (x,y) coordinate pairs) that correspond to locations of UI device 4 that display the given key. More specifically, in some examples, a bivariate Gaussian model for a key may include a distribution of coordinates that correspond to locations that are most frequently selected by a user when the user intends to select the given key.

In some examples, the respective cost values may be based on language model 50. For instance, the respective cost values may be based on the probability that a second key will be selected after a first key (e.g., the probability that the "r" key will be selected after the "f" key). In some examples, the keys for which respective cost values are determined are selected based at least in part on language model 50. In some examples, the cost values are lower where there is a greater likelihood that an alignment point indicates a key. In other examples, the cost values are higher where there is a greater likelihood that an alignment point indicates a key.

In the example of FIG. 1, decoder module 46 may determine a first cost value representing a probability that the first alignment point indicates an "F" key and a second cost value representing a probability that the first alignment point indicates a "G" key (e.g., also in proximity to the gesture path that may traverse a portion of the "F" key). Similarly, decoder module 46 may determine a third cost value representing a probability that the second alignment point indicates an "R" key and a third cost value representing a probability that the second alignment point indicates a "T" key (e.g., also in proximity to the gesture path that may traverse a portion of the "T" key). Lastly, decoder module 46 may determine a fifth cost value representing a probability that the third alignment point indicates an "I" key and a sixth cost value representing a probability that the third alignment point indicates a "U" key (e.g., also in proximity to the gesture path that may traverse a portion of the "I" key).

Decoder module 46 may compare the respective cost values for at least two keys of the plurality of keys to determine a combination of keys having a combined cost value. A combined cost value may represent a probability that the gesture path indicates a combination of keys. Decoder module 46 may compare the respective cost values for at least two keys of the plurality of keys to determine which of the at least two keys is indicated by an alignment point. Decoder module 46 may determine a combination of keys by determining which keys are indicated by each alignment point. In some examples, decoder module 46 determines which of the at least two keys is indicated by an alignment point without regard to which keys are indicated by other alignment points. In other examples, decoder module 46 determines which of the at least two keys is indicated by the alignment point based on which keys are indicated by other alignment points. In such examples, decoder module 46 may revise the determination of which key is indicated by a previous alignment point based on the respective cost values for a current alignment point.

In some examples, decoder module 46 may compare the combined cost value a determined combination of keys with a threshold value. In some examples, the threshold value is the combined cost value of a different determined combination of keys. For instance, decoder module 46 may determine a first combination of keys having a first combined cost value and a second combination of keys having a second combined cost value. In such an instance, decoder module 46 may determine that the candidate character string is based on the combination of keys with the lower combined cost value.

In some examples, decoder module 46 begins to determine a candidate character string prior to the time in which UI device 4 completes detecting the gesture path. Rather than determining the candidate character string after UI device 4 completes detecting the gesture path, decoder module 46 may determine a plurality of words as the gesture path is detected, such as "fries", "friend", and "friendship". Decoder module 46 may contemporaneously revise the determined plurality of words as the gesture path is detected, such as revision "fries" to "friend." Furthermore, rather than determining the candidate character string based on a geometric shape of the gesture, techniques of the disclosure may determine a candidate character string based on a group of characters indicated by the gesture. Decoder module 46 may send the determined word to suggestion module 48 which may then cause UI device 4 (or another display device) to display the word "now" in text entry area 14 of GUI 12.

In accordance with the techniques of this disclosure, in response to determining that a movement of the input object has ceased for at least a threshold amount of time, suggestion module 48 may output, to one of application modules 8 or for display by UI device 4 or another device, the plurality of candidate character strings in one or more floating suggestion elements. During a time that the plurality of candidate character strings are displayed, decoder module 46 may receive an indication that the movement of the input object has resumed. Furthermore, suggestion module 48 may select, in response to the indication of the resumed movement of the input object, and based at least in part on a direction of the resumed movement of the input object, a particular character string from the plurality of character strings. For instance, if a single floating suggestion element is displayed and multiple character strings are arranged horizontally within the floating suggestion element, suggestion module 48 may select a different one of the character strings in response to determining that the resumed movement is in a leftward or rightward direction.

Figure 3:
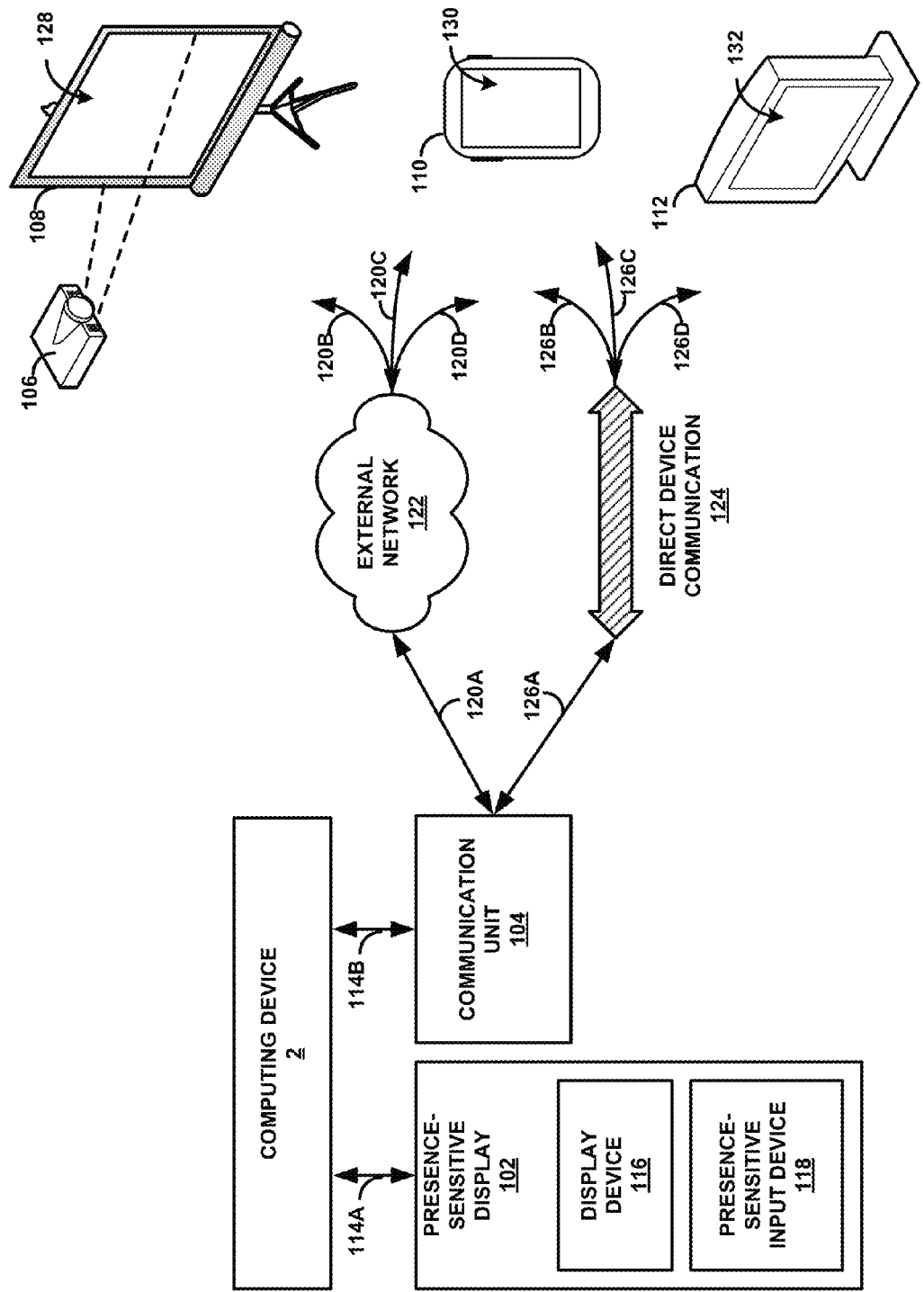
FIG. 3 is a block diagram illustrating an example in which a computing device outputs graphical content for display at one or more remote display devices, in accordance with one or more aspects of the present disclosure.

FIG. 3 is a block diagram illustrating an example computing device 2 that outputs data for display by one or more remote devices, in accordance with one or more techniques of the present disclosure. The one or more remote devices may display graphical content based on the data output by computing device 2. In general, graphical content may include any visual information that may be output for display, such as text, images, a group of moving images, etc. In some examples, computing device 2 may output data, such as Hypertext Markup Language (HTML) data, that a remote device may render to generate graphical content displayed by the remote device. In other examples, computing device 2 may output digital or analog signals that a remote device may use to generate graphical content displayed by the remote device.

In the example of FIG. 3, computing device 2 is operatively coupled to a presence-sensitive display 102 and a communication unit 104. Furthermore, in the example of FIG. 3, the one or more remote devices include a projector 106, a projection screen 108, a mobile device 110, and a visual display device 112. Computing device 2 may include and/or be operatively coupled to one or more other devices, e.g., input devices, output devices, memory, storage devices, etc. that are not shown in FIG. 3 for purposes of brevity and illustration.

Computing device 2 may be a processor that has the functionality described above with respect to processor(s) 30 (FIG. 2). For instance, computing device 2 may be a microprocessor, ASIC, or another type of integrated circuit configured to implement the techniques of this disclosure. In other examples, such as those illustrated in FIGS. 1 and 2, computing device 2 may be a stand-alone computing device that includes or is operatively coupled to a presence-sensitive display. In such examples, computing device 2 may be a desktop computer, a tablet computer, a smart television platform, a camera, a personal digital assistant (PDA), a server device, a mainframe computer, a telephone, a portable gaming device, a personal media player, a remote control device, a wearable computing device, or another type of computing device. In this disclosure, a first device may be said to be operatively coupled to a second device if the operations of the first and second devices are coupled in some way.

Computing device 2 may communicate with presence-sensitive display 102 via a communication channel 114A.

Computing device 2 may communicate with communication unit 104 via a communication channel 114B. Communication channels 114A, 114B may each include a system bus or another suitable connection. Although the example of FIG. 3 shows computing device 2, presence-sensitive display 102, and communication unit 104 as being separate, computing device 2, presence-sensitive display 102, and/or communication unit 104 may be integrated into a single device.

In the example of FIG. 3, presence-sensitive display 102 includes a display device 116 and a presence-sensitive input device 118. Display device 116 may display graphical content based on data received from computing device 2. Presence-sensitive input device 118 may determine one or more user inputs (e.g., continuous gestures, multi-touch gestures, single-touch gestures, etc.). Presence-sensitive input device 118 may use capacitive, inductive, and/or optical recognition techniques to determine the user inputs. Presence-sensitive display 102 may send indications of such user inputs to computing device 2 via communication channel 114A or another communication channel. In some examples, presence-sensitive input device 118 is physically positioned relative to display device 116 such that presence-sensitive input device 118 is able to detect the presence of an input object (e.g., a finger or a stylus) at a location on display device 116 that displays a graphical element when a user positions the input object at the location on display device 116 that displays the graphical element.

Communication unit 104 may have the functionality of one or more of communication unit(s) 34. This disclosure describes the functionality of communication unit 34 with regard to FIG. 2. Examples of communication unit 104 may include network interface cards, Ethernet cards, optical transceivers, radio frequency transceivers, Bluetooth, 3G, and WiFi radios, Universal Serial Bus (USB) interfaces, or other types of devices that are able to send and receive data. When computing device 2 outputs data for display by the one or more remote devices (such as projector 106, projection screen 108, mobile device 110, and visual display device 112), computing device 2 may output the data to a communication unit of computing device 2, such as communication unit 104. Communication unit 104 may send the data to one or more of the remote devices. The one or more remote devices may display graphical content based at least in part on the data.

Communication unit 104 may send and receive data using various communication techniques. In the example of FIG. 3, a network link 120A operatively couples communication unit 104 to an external network 122. Network links 120B, 120C, and 120D may operatively couple each of the remote devices to external network 122. External network 122 may include network hubs, network switches, network routers, or other types of devices that exchange information between computing device 2 and the remote devices illustrated in FIG. 3. In some examples, network links 120A-120D may be Ethernet, ATM or other wired and/or wireless network connections.

In some examples, communication unit 104 may use direct device communication 124 to communicate with one or more of the remote devices included in FIG. 3. Direct device communication 124 may include communications through which computing device 2 sends and receives data directly with a remote device, using wired or wireless communication. That is, in some examples of direct device communication 124, data sent by computing device 2 may not be forwarded by one or more additional devices before being received at the remote device, and vice-versa. Examples of direct device communication 124 may include Bluetooth, Near-Field Communication, Universal Serial Bus, WiFi, infrared, etc. One or more of the remote devices illustrated in FIG. 3 may be operatively coupled with communication unit 104 by communication links 126A-126D. In some examples, communication links 126A-126D may be connections using Bluetooth, Near-Field Communication, Universal Serial Bus, infrared, etc. Such connections may be wireless and/or wired connections.

In the example of FIG. 3, projector 106 receives data from computing device 2. Projector 106 may project graphical content based on the data onto projection screen 108. The example of FIG. 3 shows projector 106 as a tabletop projector and shows projection screen 108 as a freestanding screen. In other examples, computing device 2 may output data for display by other types of projection devices, such as electronic whiteboards, holographic display devices, and other suitable devices for displaying graphical content.

In some examples, projector 106 may determine one or more user inputs (e.g., continuous gestures, multi-touch gestures, single-touch gestures, etc.) at projection screen 108 and send indications of such user input to computing device 2. In such examples, projector 106 may use optical recognition or other suitable techniques to determine the user input. Projection screen 108 (e.g., an electronic whiteboard) may display graphical content based on data received from computing device 2.

Mobile device 110 and visual display device 112 may each have computing and connectivity capabilities and may each receive data that computing device 2 output for display. Examples of mobile device 110 may include e-reader devices, convertible notebook devices, hybrid slate devices, etc. Examples of visual display device 112 may include televisions, computer monitors, etc. As shown in FIG. 3, projection screen 108 may include a presence-sensitive display 128, mobile device 110 may include a presence-sensitive display 130, and visual display device 112 may include a presence-sensitive display 132. Presence-sensitive displays 128, 130, 132 may have some or all of the functionality described in this disclosure for UI device 4. In some examples, presence-sensitive displays 128, 130, 132 may include functionality in addition to the functionality of UI device 4. Presence-sensitive displays 128, 130, 132 may receive data from computing device 2 and may display graphical content based on the data. In some examples, presence-sensitive displays 128, 130, 132 may determine one or more user inputs (e.g., continuous gestures, multi-touch gestures, single-touch gestures, etc.) and send indications of such user input to computing device 2. Presence-sensitive displays 128, 130, and/or 132 may use capacitive, inductive, optical recognition techniques and/or other techniques to determine the user input.

In some examples, computing device 2 does not output data for display by presence-sensitive display 102. In other examples, computing device 2 may output data for display such that both presence-sensitive display 102 and the one or more remote devices display the same graphical content. In such examples, each respective device may display the same graphical content substantially contemporaneously. In such examples, the respective devices may display the graphical content at different times due to communication latency. In other examples, computing device 2 may output data for display such that presence-sensitive display 102 and the one or more remote devices display different graphical content.

In the example of FIG. 3, computing device 2 may output, for display at display device 116, projector 106, mobile computing device 110, visual display device 112, etc., a virtual keyboard comprising a plurality of virtual keys.

Furthermore, computing device 2 may receive an indication of a first movement of an input object along a spatial path, the first movement detected at a presence-sensitive input device, such as presence-sensitive input device 118 and/or presence-sensitive displays 128, 130, and 132. In addition, computing device 2 may determine, based at least in part on a group of one or more correspondences between locations of the plurality of virtual keys and locations along the spatial path, a plurality of character strings. In response to determining that the first movement of the input object has ceased for at least a threshold amount of time, computing device 2 may output, for display, the plurality of character strings. During a time that the plurality of character strings are displayed, computing device 2 may receive an indication of a second movement of the input object, the second movement being a continuation of the first movement. Furthermore, computing device 2 may select, in response to the indication of the second movement of the input object, and based at least in part on a direction of the second movement of the input object, a particular character string from the plurality of character strings.

Figure 4A:
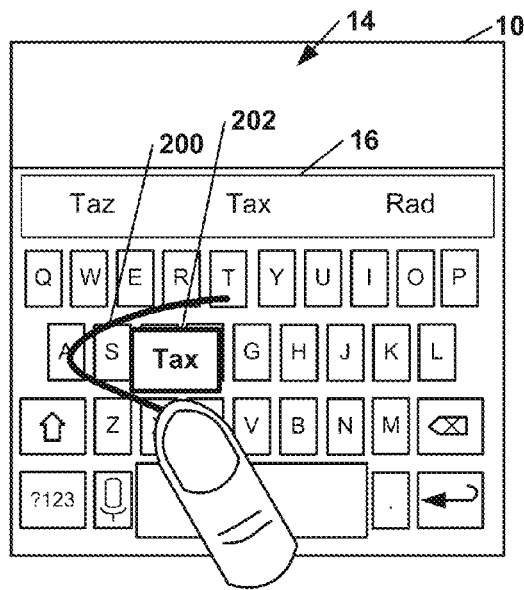
FIGS. 4A-4D are conceptual diagrams illustrating example configurations of a graphical user interface (GUI) in which character strings are arranged horizontally within a dynamically-positioned suggestion element, in accordance with one or more aspects of the present disclosure.
Figure 4B:
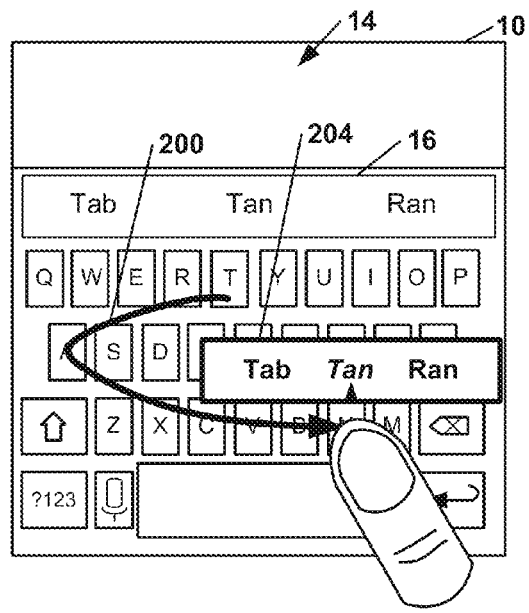
Figure 4C:
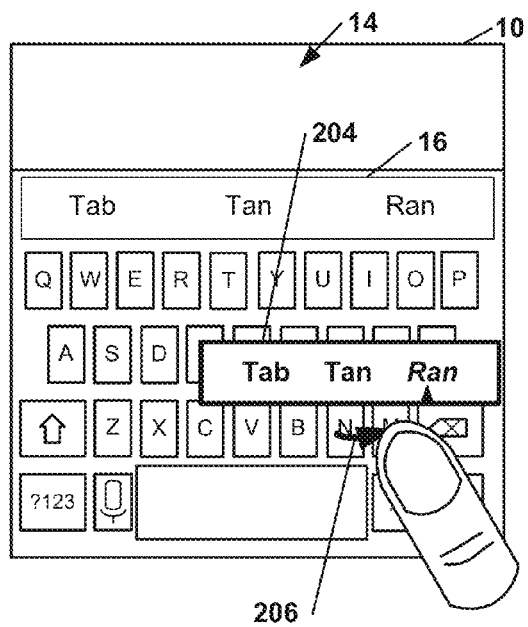

FIGS. 4A-4C are conceptual diagrams illustrating example configurations of a GUI in which character strings are horizontally arranged within a dynamically-positioned suggestion element, in accordance with one or more aspects of the present disclosure. FIG. 4A illustrates a first state of GUI 10. In FIG. 4A, computing device 2 receives an indication of a movement of a finger along a path 200. In general, path 200 starts at a location that corresponds to the virtual key for the letter "T," proceeds leftward toward the virtual key for the letter "A," and continues rightward toward the virtual key for the letter "X."

Furthermore, as illustrated in the example of FIG. 4A, computing device 2 outputs, for display, a floating preview element 202. Computing device 2 may determine, based at least in part on a current location of the finger, the location at which floating preview element 202 is displayed. In the example of FIG. 4A, floating preview element 202 is located above the current location of the finger. Computing device 2 may determine and rank character strings based at least in part on the correspondence between locations of virtual keys and locations along path 200. Floating preview element 202 may include a highest-ranked character string which, in the example of FIG. 4A, is "Tax." If computing device 2 were to receive an indication of a gesture termination event while GUI 10 is in the state shown in FIG. 4A, computing device 2 may output the character string "Tax" for display in text entry area 14. Furthermore, computing device 2 may output, for display in suggestion bar 16, other high-ranking character strings.

In the example of FIG. 4B, computing device 2 may receive an indication that the finger has continued moving past the first the virtual key for the letter "X" to a location that corresponds to the virtual key for the letter "N." Thus, path 200 continues from a location that corresponds to the virtual key for the letter "X" to a location that corresponds to the virtual key for the letter "N." When the finger is at the location that corresponds to the virtual key for the letter "N," computing device 2 may determine that the finger has remained at the location that corresponds to the virtual key for the letter "N" for at least a threshold period of time (e.g., 150 milliseconds (ms)). In response, computing device 2 may output, for display, a floating suggestion element 204. Computing device 2 may determine, based at least in part on a current location of the finger, a location at which floating suggestion element 204 is displayed.

In the example of FIG. 4A, floating suggestion element 204 includes the three character strings that currently have the highest rankings. The character strings are arranged horizontally. Specifically, in the example of FIG. 4A, floating suggestion element 204 includes the character strings "Tan," "Tab," and "Ran." The character string "Tan" may be the highest-ranked character string. The highest-ranked character string may be the currently-selected character string by default. In the example of FIG. 4A, the currently-selected character string is visually differentiated from the non-selected character strings in floating suggestion element 204 by a triangular indicator and by virtue of being in italics.

In the example of FIG. 4C, during a time that floating suggestion element 204 is displayed, computing device 2 receives an indication of a movement of the finger along a path 206. The movement along path 206 may be a continuation of the movement along path 200. Computing device 2 may not receive an indication of a gesture termination event between a time that computing device 2 determined that the finger arrived at the location corresponding the virtual key for the letter "N" and the time that computing device 2 received the indication of the movement of the finger along path 206. In response to the movement of the finger along path 206, computing device 2 may determine, based at least in part on the direction of the movement of the finger, that a different one of the character strings in floating suggestion element 204 is to be the currently-selected character string. In the example of FIG. 4C, the movement is to the right. Accordingly, computing device 2 outputs floating suggestion element 204 such that the character string to the right of the previous currently-selected character string (i.e., "Ran") is now the currently-selected character string. If the movement of the finger had been leftward, "Tab" may have been the currently-selected character string. In this way, computing device 2 may output, for display, a plurality of character strings in a horizontally-oriented array and the continued movement of the input object may be in a horizontal direction.

Figure 4D:
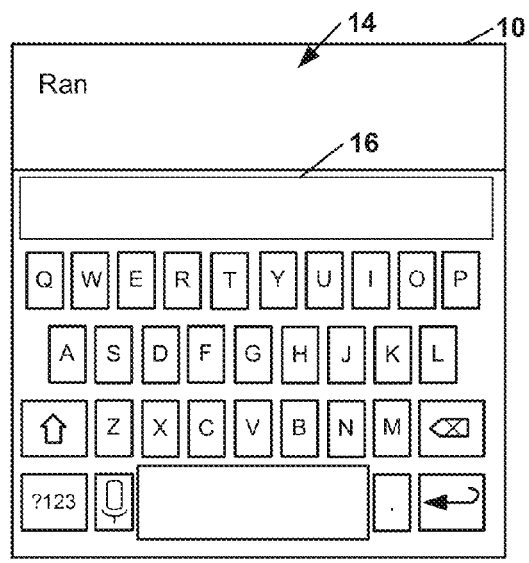

In the example of FIG. 4D, computing device 2 has received an indication of a gesture termination event while the character string "Ran" was the currently-selected character string in floating suggestion element 204. Accordingly, computing device 2 outputs the character string "Ran" for display in text entry area 14.

Figure 5A:
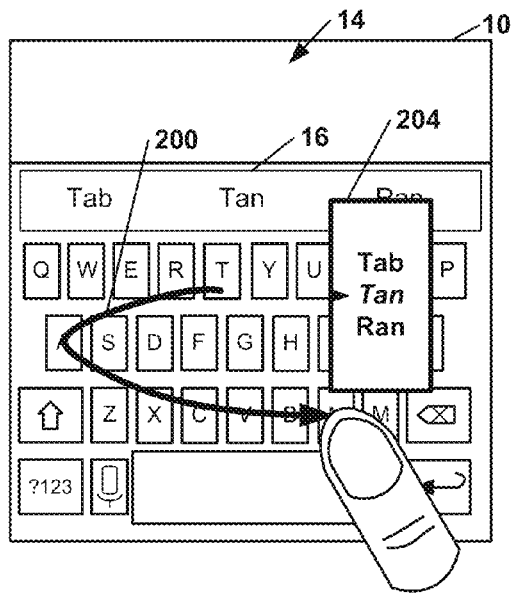
FIGS. 5A-5C are conceptual diagrams illustrating example configurations of a GUI in which character strings are arranged vertically within a dynamically-positioned suggestion element, in accordance with one or more aspects of the present disclosure.
Figure 5B:
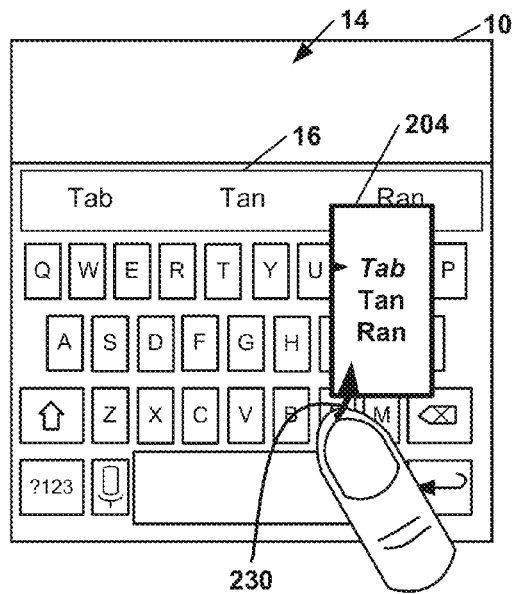
Figure 5C:
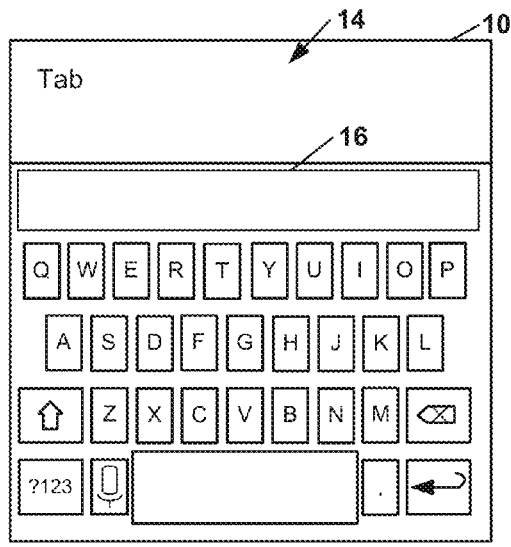

FIGS. 5A-5C are conceptual diagrams illustrating example configurations of GUI 10 in which character strings are arranged vertically within a dynamically-positioned suggestion element, in accordance with one or more aspects of the present disclosure. FIGS. 5A-5C are conceptually similar to FIGS. 4B-4C. That is, computing device 2 may receive an indication of a movement of a finger along path 200 and may determine that the finger has remained at a location that corresponds to the virtual key for the letter "N" for at least a threshold amount of time. However, in the example of FIGS. 5A and 5B, the character strings in floating suggestion element 204 are arranged vertically instead of horizontally. As shown in the example of FIG. 5B, computing device 2 may receive an indication of an upward movement of the finger along a path 230. In response to receiving the indication of the movement of the finger along path 230, computing device 2 may determine, based at least in part on a direction of the movement, that another one of the character strings in floating suggestion element 204 is to be the currently-selected character string. Because, in the example of FIG. 5B, the movement of the finger is upward and because the character string "Tab" is above the previous currently-selected character string "Tan," computing device 2 selects the character string "Tab" as the new currently-selected character string and outputs floating suggestion element 204 such that "Tab" is indicated as the currently-selected character string. As shown in the example of FIG. 5C, if computing device 2 receives an indication of a gesture termination event while "Tab" is the currently-selected character string, computing device 2 may output "Tab" for display in text entry area 14. In this way, computing device 2 may output, for display, a plurality of character strings in a vertically-oriented array and the continued movement of the input object may be in a vertical direction.

Figure 6A:
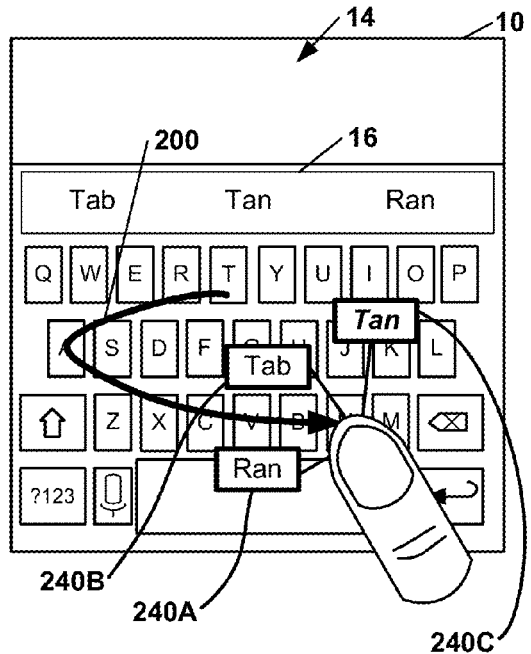
FIGS. 6A-6C are conceptual diagrams illustrating example configurations of a GUI in which dynamically-positioned suggestion elements are arranged radially, in accordance with one or more aspects of the present disclosure.
Figure 6B:
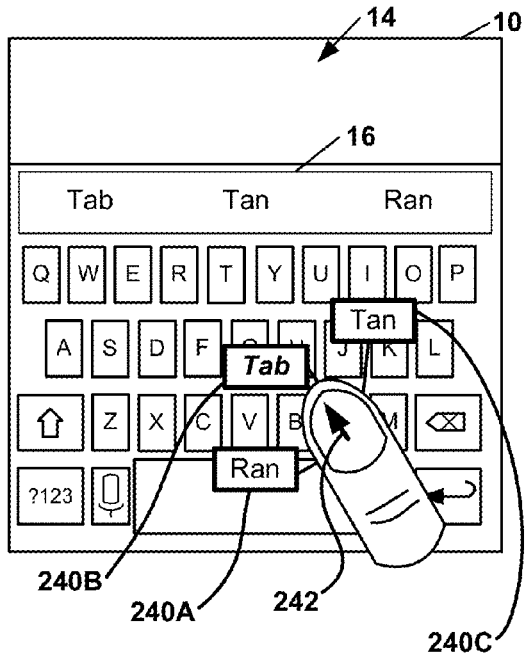
Figure 6C:
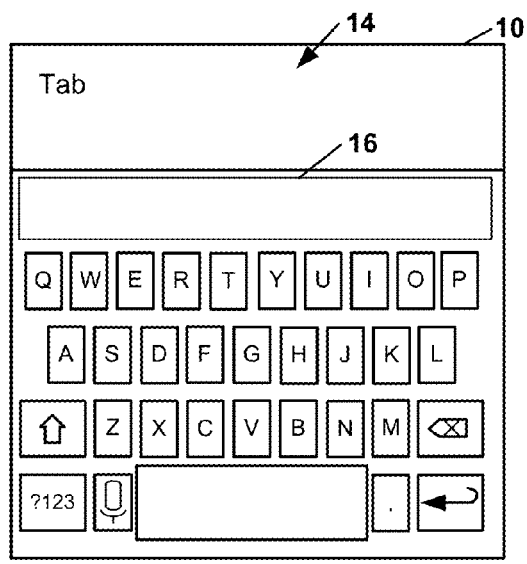

FIGS. 6A-6C are conceptual diagrams illustrating example configurations of GUI 10 in which dynamically-positioned (i.e., floating) suggestion elements are arranged radially, in accordance with one or more aspects of the present disclosure. As in FIGS. 4A and 5A, computing device 2 may, in the example of FIG. 6A, receive an indication of a movement of a finger along path 200. In response to determining that the finger has remained at the location corresponding to the virtual key for the letter "N" for at least a threshold amount of time, computing device 2 may output, for display, a plurality of floating suggestion elements, 240A, 240B, and 240C (collectively, "floating suggestion elements 240"). Each of floating suggestion elements 240 includes a single character string. Furthermore, in the example of FIGS. 6A and 6B, floating suggestion elements may be arranged radially from a current location of the finger. That is, real or perceived distances between the current location of the finger (i.e., input object) and floating suggestion elements 240 (and/or character strings) may be substantially equal. In the example of FIGS. 6A and 6B, radial lines may connect a location corresponding to the finger with locations corresponding to floating suggestion elements 240.

In the example of FIG. 6A, the character string in floating suggestion element 240C is the currently-selected suggestion element. The character string in floating suggestion element 240C is visually differentiated from the character strings in floating suggestion elements 240A and 240B by virtue of being in bold italics. Computing device 2 may change which one of the character strings is the currently-selected character string in response to an indication of a continued movement of the finger in a direction toward a location corresponding to one of floating suggestion elements 240. For instance, in the example of FIG. 6B, computing device 2 has received an indication of a continued movement of the finger along a path 242 toward the location corresponding to floating suggestion element 240B. Accordingly, computing device 2 may output floating suggestion element 240B such that the character string in floating suggestion element 240B (i.e., "Tab") is visually indicated as the currently-selected character string. As shown in the example of FIG. 6C, if computing device 2 receives an indication of a gesture termination event while floating suggestion element 240B contains the currently-selected character string, computing device 2 may output the currently-selected character string (i.e., "Tab") for display in text entry area 14.

Figure 7A:
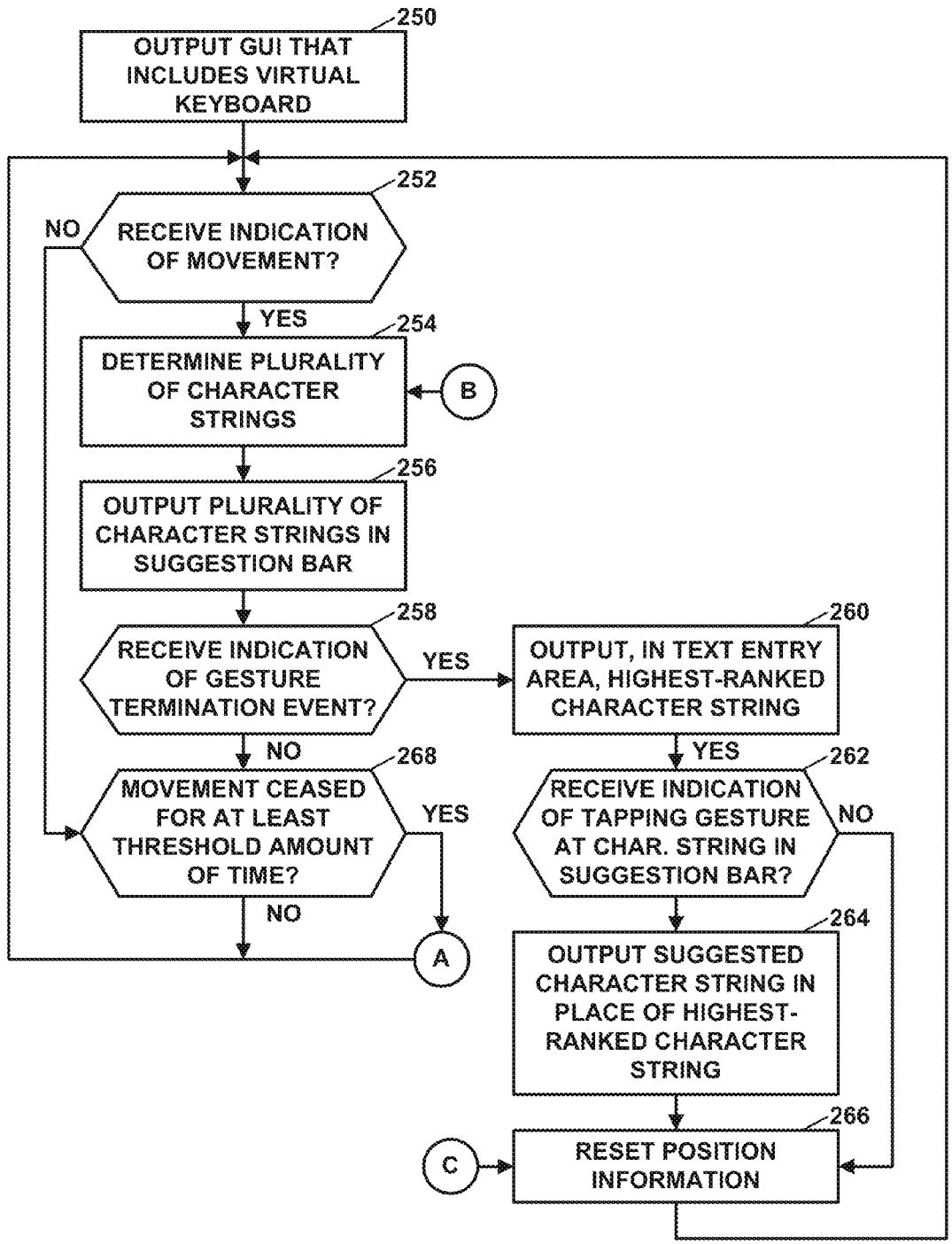
FIGS. 7A and 7B are flowcharts illustrating an example operation of a computing device, in accordance with one or more aspects of this disclosure.
Figure 7B:
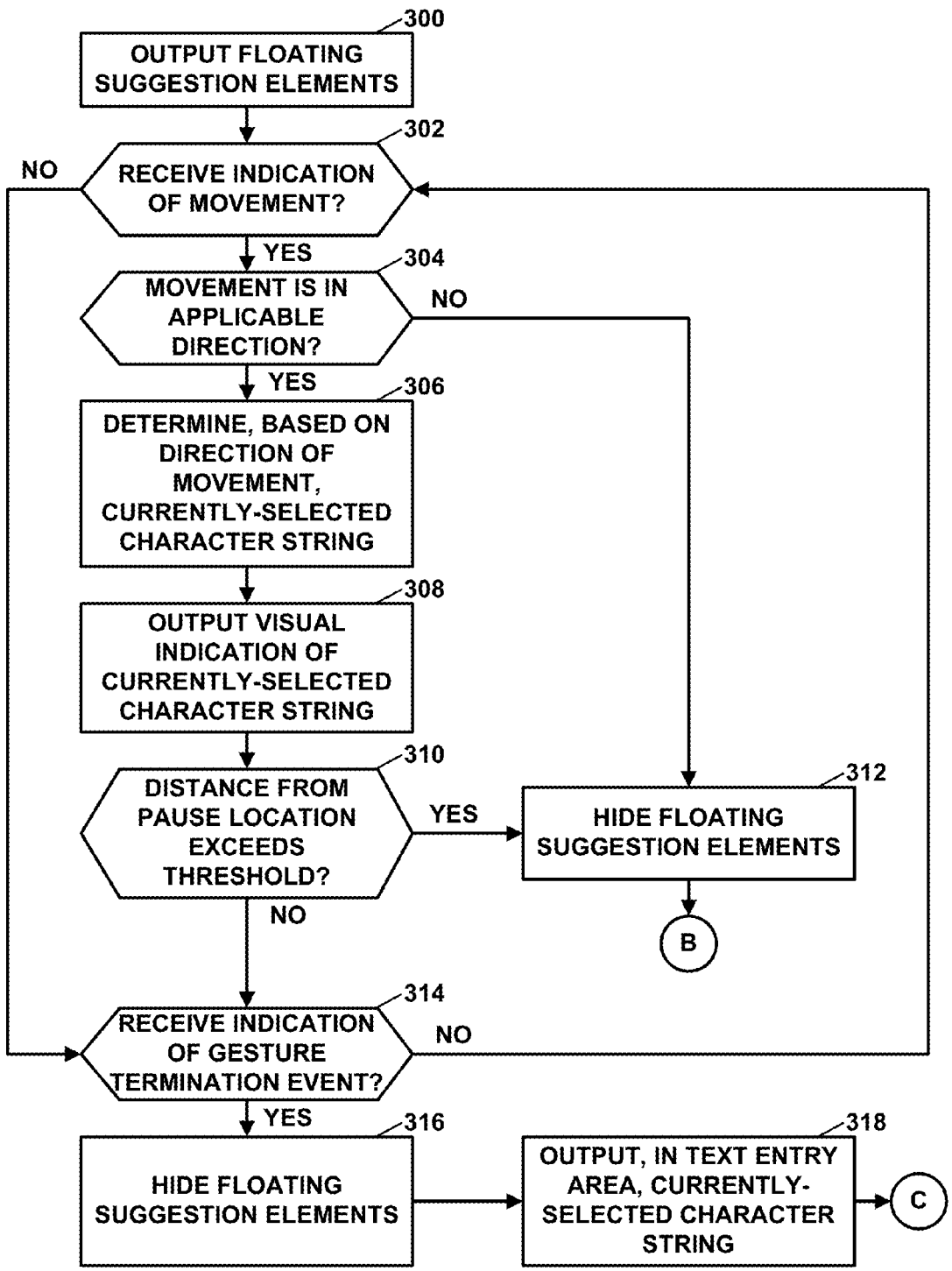

FIGS. 7A and 7B are flowcharts illustrating an example operation of computing device 2, in accordance with one or more aspects of this disclosure. In the example of FIG. 7A, IME module 6 may output, for display by a display device (e.g., UI device 4, display device 116, etc.), GUI 10, which includes virtual keyboard 12 (250). Virtual keyboard 12 includes a plurality of virtual keys. While GUI 10 is displayed, IME module 6 may determine whether IME module 6 has received an indication of a movement of an input object along a spatial path (252).

In response to determining that IME module 6 has received an indication of a movement of an input object ("YES" branch of 252), IME module 6 may determine, based at least in part on a group of one or more correspondences between locations of the plurality of virtual keys and locations along the spatial path (254). In some examples, IME module 6 may determine character strings based on multiple factors including, e.g., speed of gesture, inflection points in the spatial path. In this way, IME module 6 may determine, based on factors independent of letters selected in the gesture, a confidence metric about whether the user is selecting a letter or just passing through a letter corresponding to a key of virtual keyboard 12 on its way to another letter.

Furthermore, IME module 6 may output, for display by the display device, a plurality of character strings in suggestion bar 16 of GUI 10 (256). The character strings displayed in suggestion bar 16 may be the highest-ranked character strings, given the movement along the spatial path. In some examples, IME module 6 may also output, for display by the display device, a floating preview element that includes a highest-ranked character string.

IME module 6 may then determine whether IME module 6 has received an indication of a gesture termination event (258). In response to determining that IME module 6 has received an indication of a gesture termination event ("YES" branch of 258), IME module 6 may output, for display in text entry area 14, a highest-ranked character string (260).

Furthermore, after IME module 6 outputs the highest-ranked character string, IME module 6 may determine whether IME module 6 has received an indication of a tapping gesture at a location that corresponds to a character string (i.e., a suggested character string) in suggestion bar 16 (262). In response to receiving an indication of a tapping gesture at a location that corresponds to the suggested character string ("YES" branch of 262), IME module 6 may output, for display in text entry area 14, the suggested character string in place of the highest-ranked character string (264). For example, if IME module 6 output the character string "This" in action 260 and the character string "Thirds" is the suggested character string, IME module 6 may output, for display in text entry area 14, the character string "Thirds" in place of the character string "This."

In either case, after IME module 6 receives the indication of the gesture termination event, IME module 6 may reset the position information associated with the movement of the input object (266). Thus, IME module 6 may interpret a subsequent movement of the input object as relating to input of a subsequent character string and not as relating to input of further characters of the character string that is currently being input. Subsequently, IME module 6 may determine again whether IME module 6 has received an indication of a movement of an input object (252).

Furthermore, in the example of FIG. 7A, in response to determining that IME module 6 has not received an indication of a gesture termination event ("NO" branch of 258) or in response to determining that IME module 6 has not received an indication of a movement of the input object ("NO" branch of 252), IME module 6 may determine whether movement of the input object has ceased for at least a threshold amount of time (268). For instance, IME module 6 may determine that the input object has remained at a location corresponding to a particular virtual key for at least the threshold amount of time. In response to determining that the movement of the input object has not ceased for the threshold amount of time ("NO" branch of 268), IME module 6 may determine whether IME module 6 has received further indications of movement of the input object (252). However, in response to determining that the movement of the input object has ceased for at least the threshold amount of time ("YES" branch of 268), IME module 6 may perform the actions shown in FIG. 7B (denoted in FIG. 7A by the circled "A").

FIG. 7B is a flowchart illustrating further actions of the flowchart of FIG. 7A. In the example of FIG. 7B, IME module 6 may output, for display by the display device, one or more floating suggestion elements (300). IME module 6 may determine the locations of the floating suggestion elements based at least in part on a current location of the input object.

During a time that the floating suggestion elements are displayed, IME module 6 may determine whether IME module 6 has receive an indication of a further movement of the input object (302). In response to determining that IME module 6 has received an indication of a further movement of the input object ("YES" branch of 302), IME module 6 may determine whether the further movement of the input object is substantially in (e.g., within 10° of) an applicable direction (304). In at least some examples where IME module 6 outputs a single floating suggestion element and character strings in the floating suggestion element are arranged horizontally, the applicable direction may be a substantially horizontal (e.g., leftward or rightward) direction. In at least some examples where IME module 6 outputs a single floating suggestion element and character strings in the floating suggestion element are arranged vertically, the applicable direction may be a substantially vertical (e.g., upward or downward) direction. In at least some examples where IME module 6 outputs multiple floating suggestion elements that each include a single character string, applicable directions may include directions that are substantially toward the floating suggestion elements.

In response to determining that the movement of the input object is substantially in an applicable direction ("YES" branch of 304), IME module 6 may determine, based at least in part on a direction of the movement, a currently-selected character string from among the character strings displayed in the one or more floating suggestion elements (306). Furthermore, IME module 6 may output, for display by the display device, a visual indication of the currently-selected character string (308). For instance, IME module 6 may output the currently-selected character string in italics. In this way, IME module 6 may output, in response to receiving the indication of the continued/resumed movement of the input object and based at least in part on the direction of the continued/resumed movement of the input object, and for display, the particular currently-selected character string such that the particular character string is indicated as being currently selected.

Movement of the input object beyond a particular distance may indicate that the user does not wish to select any of the character strings displayed in the one or more floating suggestion elements. For example, in FIG. 4B, if IME module 6 receives an indication of a leftward movement of the finger from the location corresponding to the virtual key for the letter "N" to a location corresponding to the virtual key for the letter "Z," IME module 6 may determine that the user does not wish to select the character string "Tab" from floating suggestion element 204, but rather may wish to enter a different character string, such as "Tanzania."

Hence, IME module 6 may determine whether a (real or perceptual) distance from a current location of the input object to a pause location exceeds a distance threshold (310). In some examples, the distance threshold may be 50 pixels. The pause location corresponds to the location at which the movement of the input object paused for at least the threshold amount of time. In response to determining that the distance from the current location of the input object to the pause location exceeds the distance threshold ("YES" branch of 312), IME module 6 may output GUI 10 such that the one or more floating suggestion elements are hidden (312). Furthermore, IME module 6 may perform the actions shown in FIG. 7A following the circled "B." That is, IME module 6 may determine, based at least in part on a group of correspondences between locations of virtual keys and locations along a spatial path of the input object (including the portion of the spatial path corresponding to the movement of action 302), a plurality of character strings which IME module 6 may output in suggestion bar 16, and so on.

In this way, IME module 6 may select, in response to determining that a distance traveled by the input object during the continued movement of the input object (i.e., the movement of the input object after movement of the input object resumed) is less than a threshold distance, and based at least in part on the direction of the continued movement of the input object, a particular character string from the plurality of character strings. In response to determining that the distance traveled by the input object during the continued movement of the input object is greater than the threshold distance, IME module 6 may output GUI 10 such that the one or more suggestion elements (and the one or more character strings displayed therein) are no longer visible. Furthermore, in this way, IME module 6 may determine, in response to determining that the distance traveled by the input object during the continued movement of the input object is greater than the threshold distance, and based at least in part on a correspondence between locations of the virtual keys and locations along the spatial path and one or more locations along the extension of the spatial path, a second plurality of character strings that is different than the first plurality of character strings. The extension of the spatial path may be a path followed after movement of the input object resumes. IME module 6 may output, for display, the second plurality of character strings. In some instances, IME module 6 may output the second plurality of character strings for display in a suggestion bar (e.g., suggestion bar 16) located above the virtual keyboard.

Similarly, movement of the input object in a direction that is not one of the applicable directions may indicate that the user does not wish to select any of the character strings displayed in the one or more floating suggestion elements. For example, in FIG. 4B, the applicable directions may be leftward and rightward. In this example, if IME module 6 receives an indication of an upward movement of the finger from the location corresponding to the virtual key for the letter "N" to a location corresponding to the virtual key for the letter "P," IME module 6 may determine that the user does not wish to select "Tab," "Tan," or "Ran," but rather may wish to enter a different character string, such as "trampoline."

Hence, in response to determining that the movement of the input object is not in an applicable direction ("NO" branch of 302), IME module 6 may output GUI 10 such that the one or more floating suggestion elements are hidden (312). Furthermore, IME module 6 may perform the actions shown in FIG. 7A following the circled "B." That is, IME module 6 may determine, based at least in part on a group of correspondences between locations of virtual keys and locations along a spatial path of the input object (including the portion of the spatial path corresponding to the movement of action 302), a plurality of character strings which IME module 6 may output in suggestion bar 16, and so on.

In the example of FIG. 7B, if IME module 6 does not receive an indication of a further movement of the input object ("NO" branch of 302), IME module 6 may determine whether IME module 6 has received an indication of a gesture termination event (314). If IME module 6 does not receive an indication of a gesture termination event ("NO" branch of 314), IME module 6 may determine whether IME module 6 has received additional indications of movement of the input object (302).

However, in response to determining that IME module 6 received an indication of the gesture termination event ("YES" branch of 314), IME module 6 may output GUI 10 such that the one or more floating suggestion elements are hidden from GUI 10 (316). Furthermore, IME module 6 may output, in text entry area 14, the currently-selected character string (318). IME module 6 may then perform the actions shown in FIG. 7A following the circled "C." That is, IME module 6 may reset the position information and wait to receive additional indications of movement. In this way, IME module 6 may determine that subsequent movements of the input object correspond to entry of a subsequent character string.

Figure 8:
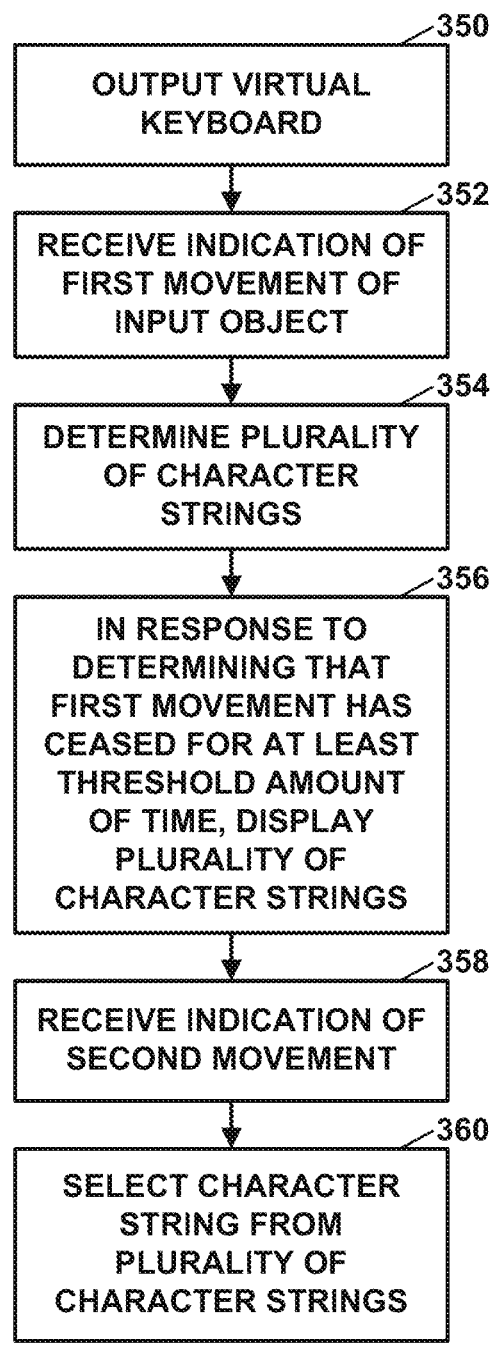
FIG. 8 is a flowchart illustrating an example operation of the computing device, in accordance with one or more aspects of this disclosure.

FIG. 8 is a flowchart illustrating an example operation of computing device 2, in accordance with one or more aspects of this disclosure. In the example of FIG. 8, computing device 2 may output, for display, a virtual keyboard comprising a plurality of virtual keys (350). Furthermore, computing device 2 may receive an indication of a first movement of an input object along a spatial path (352). The first movement may be detected at a presence-sensitive input device. In addition, computing device 2 may determine, based at least in part on a group of one or more correspondences between locations of the plurality of virtual keys and locations along the spatial path, a plurality of character strings (354).

In response to determining that the first movement of the input object has ceased for at least a threshold amount of time, computing device 2 may output, for display, the plurality of character strings (356). In some examples, computing device 2 may determine, based at least in part on the current location of the input object, a location of a display device at which the plurality of character strings should be displayed. For instance, computing device 2 may determine that the plurality of character strings are to be displayed ten pixels above the current location of the input object.

During a time that the plurality of character strings are displayed, computing device 2 may receive an indication of a second movement of the input object, wherein the second movement is a continuation of the first movement (358). For instance, during a time that a suggestion element containing the plurality of character strings is displayed, computing device 2 may receive an indication that the movement of the input object has resumed.

Computing device 2 may select, in response to the indication of the second movement of the input object, and based at least in part on a direction of the second movement of the input object, a particular character string from the plurality of character strings (360). In some examples, computing device 2 may determine, based at least in part on a direction of the movement of the input object after the movement of the input object resumed, that the particular character string from the plurality of character strings is the currently-selected character string.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

The invention claimed is:

1. A method comprising:
receiving, by a computing device, an indication of movement of an input object along a spatial path of a presence-sensitive input device operatively coupled to the computing device, the computing device being operatively coupled to a display device;
determining, by the computing device and based at least in part on one or more respective locations along the spatial path, a plurality of character strings;
detecting, after receiving the indication of movement of the input object along the spatial path, a suspension of movement of the input object for an amount of time that exceeds a threshold, wherein during the suspension of movement of the input object, the input object is at a particular location of the display device;
responsive to detecting the suspension of movement of the input object, outputting, by the computing device, the plurality of character strings for display at locations of the display device determined based on the particular location;
during a time period that the plurality of character strings is displayed, receiving, by the computing device, an indication of a resumption of movement of the input object following the suspension of movement of the input object;
responsive to receiving the indication of the resumption of movement, selecting by the computing device, based on a direction of movement of the input object after the resumption of movement, a particular character string from the plurality of character strings; and
responsive to receiving an indication of a termination of movement of the input object after the resumption of movement, outputting, by the computing device, for display in a text input area displayed by the display device, the selected character string.

2. The method of claim 1, wherein selecting the particular character string comprises:
selecting, by the computing device, based on the direction of movement of the input object after the resumption of movement being toward the particular character string, the particular character string from the plurality of character strings.

3. The method of claim 1, wherein:
outputting the plurality of character strings comprises outputting, by the computing device, for display, the plurality of character strings in a horizontally-oriented or vertically-oriented array.

4. The method of claim 1,
wherein outputting the plurality of character strings comprises outputting, by the computing device, for display, the plurality of character strings such that, for each respective character string of the plurality character strings, a distance between the respective character string and the particular location is substantially equal to a same value.

5. The method of claim 1, further comprising:
responsive to determining that the direction of movement of the input object after the resumption of the movement is not an applicable direction, removing, by the computing device, the plurality of character strings from display, wherein:
if the plurality of character strings is displayed in a horizontally-oriented array, the applicable direction is leftward or rightward,
if the plurality of character strings is displayed in a vertically-oriented array, the applicable direction is upward or downward, and
if the plurality of character strings are displayed such that, for each respective character string of the plurality character strings, a distance between the respective character string and the particular location is substantially equal to a same value, the applicable direction is toward one of the character strings.

6. The method of claim 1, wherein:
the plurality of character strings is a first plurality of character strings,
after the resumption of movement, movement of the input object is along an extension of the spatial path,
selecting the particular character string comprises:
responsive to determining that a distance traveled by the input object after the resumption of movement is less than a threshold distance, selecting, by the computing device, based at least in part on a direction of the input object along the extension of the spatial path, the particular character string from the plurality of character strings, and
the method further comprises:
responsive to determining that the distance traveled by the input object after the resumption of movement is greater than the threshold distance, determining, by the computing device, based at least in part on respective locations of the virtual keys and respective locations along the spatial path and one or more locations along the extension of the spatial path, a second plurality of character strings that is different than the first plurality of character strings; and
outputting, by the computing device, for display, the second plurality of character strings.

7. The method of claim 1, further comprising, responsive to selecting the particular character string, outputting, by the computing device, for display, the particular character string such that the particular character string is indicated as being currently selected.

8. The method of claim 1, wherein determining the plurality of character strings comprises: determining, by the computing device and based at least in part on the one or more respective locations along the spatial path and respective locations of one or more virtual keys of a virtual keyboard, the plurality of character strings.

9. A computing device comprising one or more processors configured to:
responsive to receiving an indication of movement of an input object along a spatial path, determine, based at least in part on one or more respective locations along the spatial path, a plurality of character strings, wherein movement of the input object is detected at a presence-sensitive input device operatively coupled to the computing device, the computing device being operatively coupled to a display device;
detect, after receiving the indication of movement of the input object along the spatial path, a suspension of movement of the input object for at least an amount of time that exceeds a threshold, wherein during the suspension of movement of the input object, the input object is at a particular location of the display device;
responsive to detecting the suspension of movement of the input object, output the plurality of character strings for display at locations of the display device determined based on the particular location;
responsive to receiving an indication of a resumption of movement of the input object following the suspension of movement of the input object and during a time period that the plurality of character strings is displayed, selecting, by the computing device, based on a direction of movement of the input object after the resumption of movement, a particular character string from the plurality of character strings; and
responsive to receiving an indication of a termination of movement of the input object, output, for display in a text input area displayed by the display device, the selected character string.

10. The computing device of claim 9, wherein the one or more processors are configured to:
select, based on the direction of movement of the input object after the resumption of movement being toward the particular character string, the particular character string from the plurality of character strings.

11. The computing device of claim 9, wherein the one or more processors are configured to:
output, for display, the plurality of character strings in a horizontally-oriented or vertically-oriented array.

12. The computing device of claim 9, wherein the one or more processors are configured to:
output, for display, the plurality of character strings such that, for each respective character string of the plurality character strings, a distance between the respective character string and the particular location is substantially equal to a same value.

13. The computing device of claim 9, wherein:
the one or more processors are configured to remove the plurality of character strings from display responsive to determining that the direction of movement of the input object after the resumption of movement is not an applicable direction,
if the plurality of character strings is displayed in a horizontally-oriented array, the applicable direction is leftward or rightward,
if the plurality of character strings is displayed in a vertically-oriented array, the applicable direction is upward or downward, and
if the plurality of character strings are displayed such that, for each respective character string of the plurality character strings, a distance between the respective character string and the particular location is substantially equal to a same value, the applicable direction is toward one of the character strings.

14. The computing device of claim 9, wherein:
the plurality of character strings is a first plurality of character strings,
after the resumption of movement, movement of the input object is along an extension of the spatial path, and
the one or more processors are configured to:
responsive to determining that a distance traveled by the input object after the resumption of movement is less than a threshold distance, select, based at least in part on a direction of the input object along the extension of the spatial path, the particular character string from the plurality of character strings;
responsive to determining that the distance traveled by the input object after the resumption of movement is greater than the threshold distance, determine, based at least in part on respective locations of the virtual keys and respective locations along the spatial path and one or more locations along the extension of the spatial path, a second plurality of character strings that is different than the first plurality of character strings; and
output, for display, the second plurality of character strings.

15. The computing device of claim 9, wherein the one or more processors are configured to, responsive to selecting the particular character string, output, for display, the particular character string such that the particular character string is indicated as being currently selected.

16. The computing device of claim 9, wherein the one or more processors are configured to determine, based at least in part on the one or more respective locations along the spatial path and respective locations of one or more virtual keys of a virtual keyboard, the plurality of character strings.

17. A non-transitory computer-readable data storage medium having instructions stored thereon that, when executed, cause a computing device to:
responsive to receiving an indication of movement of an input object along a spatial path, determine, based at least in part on one or more respective locations along the spatial path and respective locations of one or more virtual keys of a virtual keyboard, a plurality of character strings, wherein movement of the input object is detected at a presence-sensitive input device operatively coupled to the computing device, the computing device being operatively coupled to a display device;
detect, after receiving the indication of movement of the input object along the spatial path, a suspension of movement of the input object for at least an amount of time that exceeds a threshold, wherein during the suspension of movement of the input object, the input object is at a particular location of the display device;
responsive to detecting the suspension of movement of the input object, output the plurality of character strings for display at locations of the display device determined based on the particular location;
responsive to receiving an indication of a resumption of movement of the input object following the suspension of movement of the input object and during a time period that the plurality of character strings is displayed, select, based on a direction of movement of the input object after the resumption of movement, a particular character string from the plurality of character strings; and
responsive to receiving an indication of a termination of the input object after the resumption of movement, output, for display in a text input area displayed by the display device, the selected character string.

18. The non-transitory computer-readable data storage medium of claim 17, wherein the instructions cause the computing device to:
select, based on the direction of movement of the input object after the resumption of movement being toward the particular character string, the particular character string from the plurality of character strings.

19. The non-transitory computer-readable data storage medium of claim 17, wherein:
the plurality of character strings is a first plurality of character strings,
after the resumption of movement, movement of the input object is along an extension of the spatial path, and
the instructions cause the computing device to:
responsive to determining that a distance traveled by the input object after the resumption of movement is less than a threshold distance, select, based at least in part on a direction of the input object along the extension of the spatial path, the particular character string from the plurality of character strings;

responsive to determining that the distance traveled by the input object after the resumption of movement is greater than the threshold distance, determine, based at least in part on respective locations of the virtual keys and respective locations along the spatial path and one or more locations along the extension of the spatial path, a second plurality of character strings that is different than the first plurality of character strings; and output, for display, the second plurality of character strings.

20. The non-transitory computer-readable data storage medium of claim 17, wherein:

the instructions cause the computing device to remove, responsive to determining that the direction of movement of the input object after the resumption of movement is not an applicable direction, the plurality of character strings from display, if the plurality of character strings is displayed in a horizontally-oriented array, the applicable direction is leftward or rightward, if the plurality of character strings is displayed in a vertically-oriented array, the applicable direction is upward or downward, and if the plurality of character strings are displayed such that, for each respective character string of the plurality character strings, a distance between the respective character string and the particular location is substantially equal to a same value, the applicable direction is toward one of the character strings.

* * * * *